(12) United States Patent
King et al.

(10) Patent No.: US 12,271,790 B1
(45) Date of Patent: Apr. 8, 2025

(54) SYSTEM AND METHOD FOR ADJUSTING TRACK USING SENSOR DATA

(71) Applicant: Aurora Innovation, Inc., Palo Alto, CA (US)

(72) Inventors: Davis Edward King, Billerica, MA (US); Yan Li, San Francisco, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 761 days.

(21) Appl. No.: 17/235,371

(22) Filed: Apr. 20, 2021

(51) Int. Cl.
*G06N 20/00* (2019.01)
*G01S 13/58* (2006.01)
*G01S 17/58* (2006.01)

(52) U.S. Cl.
CPC .............. *G06N 20/00* (2019.01); *G01S 13/58* (2013.01); *G01S 17/58* (2013.01); *B60W 2420/408* (2024.01)

(58) Field of Classification Search
CPC ......... G06N 20/00; G01S 13/58; G01S 17/58; B60W 2420/52
See application file for complete search history.

(56) References Cited

U.S. PATENT DOCUMENTS

| | | | |
|---|---|---|---|
| 8,831,780 B2 | 9/2014 | Zelivinski et al. | |
| 9,807,564 B2 | 10/2017 | Aksamit | |
| 2019/0079526 A1* | 3/2019 | Vallespi-Gonzalez | G01S 7/4802 |
| 2020/0272160 A1* | 8/2020 | Djuric | G06T 7/20 |

\* cited by examiner

*Primary Examiner* — Bernarr E Gregory
*Assistant Examiner* — Juliana Cross
(74) *Attorney, Agent, or Firm* — FOLEY & LARDNER LLP

(57) ABSTRACT

A method includes obtaining a first track associated with an object. A first set of parameters is generated based on the first track. Measurement data are obtained from one or more sensors. A first set of features are extracted from the measurement data. Based on the first set of parameters and the first set of features, a second set of parameters are generated by a machine learning model. The second set of parameters represent an adjustment to the first set of parameters. Based on the second set of parameters, the first track is adjusted to generate a second track associated with the object. The second track is provided to an autonomous vehicle control system for autonomous control of a vehicle.

18 Claims, 11 Drawing Sheets

SYSTEM AND METHOD FOR ADJUSTING TRACK USING SENSOR DATA

TECHNICAL FIELD

The present embodiments relate generally to systems and methods for training a machine learning (ML) model and generating data using the trained ML model, and more particularly to system and method for training an ML model and generating an adjustment to track data associated with an object using a trained or learned ML model that receives, as input, measurement data from sensors and previous track data associated with the object.

BACKGROUND

A fundamental challenge to any autonomous vehicle related technology relates to collecting and interpreting information about a vehicle's surrounding environment, along with planning and executing commands to appropriately control vehicle motion to navigate the vehicle through its current environment. For example, measurement data can be captured from one or more sensors of an autonomous vehicle (or a vehicle equipped with autonomous vehicle sensors) and used for tracking and/or identifying dynamic objects within the environment surrounding the vehicle. As the state of the objects dynamically changes, improvement in efficiently updating the tracking and/or identifying of the object by using new measurement data remains desired. Moreover, when sensors of an autonomous vehicle can obtain measurements at multiple points (e.g., multiple point radar measurements), improvement in efficient processing of multiple points is desired.

SUMMARY

Implementations of the present disclosure relate to system and method for training an ML model and generating an adjustment to track data associated with an object using a trained or learned ML model that receives, as input, measurement data from sensors and previous track data associated with the object.

In some implementations according to a first aspect of the present disclosure, a method includes obtaining a first track associated with an object. The method may include generating a first set of parameters based on the first track. The method may include obtaining measurement data from one or more sensors. The method may include extracting a first set of features from the measurement data. The method may include generating, based on the first set of parameters and the first set of features, a second set of parameters by a machine learning model, the second set of parameters representing an adjustment to the first set of parameters. The method may include adjusting, based on the second set of parameters, the first track to generate a second track associated with the object. The method may include providing the second track to an autonomous vehicle control system for autonomous control of a vehicle.

In some implementations according to a second aspect of the present disclosure, a system includes one or more processors and one or more memories operably coupled with the one or more processors. The one or more memories may store instructions that, in response to the execution of the instructions by one or more processors, cause the one or more processors to obtain a first track associated with an object. The one or more processors may generate a first set of parameters based on the first track, obtain measurement data from one or more sensors, extract a first set of features from the measurement data, generate, based on the first set of parameters and the first set of features, a second set of parameters by a machine learning model, the second set of parameters representing an adjustment to the first set of parameters, adjust, based on the second set of parameters, the first track to generate a second track associated with the object, and provide the second track to an autonomous vehicle control system for autonomous control of a vehicle.

In some implementations according to a third aspect of the present disclosure, at least one non-transitory computer-readable medium includes instructions that, in response to execution of the instructions by one or more processors, cause one or more processors to obtain first track associated with a first time. The one or more memories may store instructions that, in response to the execution of the instructions by one or more processors, cause the one or more processors to obtain a first track associated with an object. The one or more processors may generate a first set of parameters based on the first track, obtain measurement data from one or more sensors, extract a first set of features from the measurement data, generate, based on the first set of parameters and the first set of features, a second set of parameters by a machine learning model, the second set of parameters representing an adjustment to the first set of parameters, adjust, based on the second set of parameters, the first track to generate a second track associated with the object, and provide the second track to an autonomous vehicle control system for autonomous control of a vehicle.

BRIEF DESCRIPTION OF THE DRAWINGS

These and other aspects and features of the present implementations will become apparent to those ordinarily skilled in the art upon review of the following description of specific implementations in conjunction with the accompanying figures, wherein.

DETAILED DESCRIPTION

Figure 1:
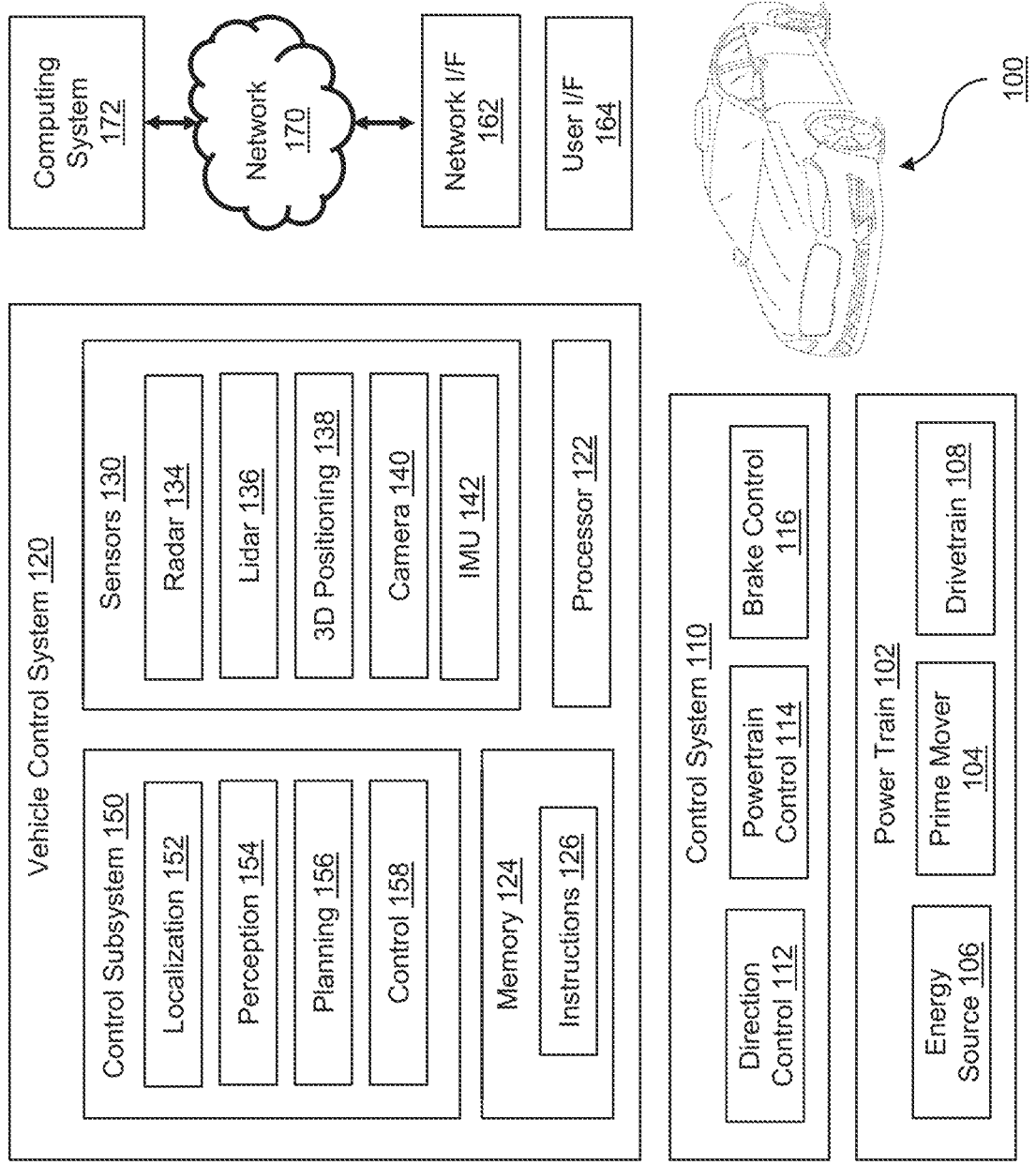
FIG. 1 is a block diagram illustrating an example of a system environment for autonomous vehicles according to some implementations.

According to certain aspects, embodiments in the present disclosure relate to techniques for training a machine learning (ML) model and generating data using the trained ML model and particularly to a system and a method for training an ML model and generating an adjustment to track data associated with an object using a trained or learned ML model that receives, as input, measurement data from sensors and previous track data associated with the object.

In order to appropriately control motions of an autonomous vehicle to navigate the vehicle through its current environment, measurement data may be captured from one or more sensors of an autonomous vehicle (or a vehicle equipped with autonomous vehicle sensors) and used for tracking and/or identifying dynamic objects within the environment surrounding the vehicle. As the state of the objects dynamically changes, there is a need for updating the tracking and/or identifying of the object, e.g., by using new measurement data. Conventional systems updated a track associated with on object by scanning data measured from the whole scene surrounding the vehicle, incurring significant delays and/or inefficient processing of collected data in updating the track. For example, conventional systems may need to collect new measurement data from the whole scene surrounding the vehicle, and match or associate the new measurement data with respective tracks of objects to identify where all those objects are in the new scene. This "association" processing may incur significant delays and inefficient processing in updating the track. Moreover, when sensors of an autonomous vehicle can obtain measurements at multiple points (e.g., multiple point radar measurements), these delays and inefficient processing may become even worse.

To solve these problems, according to certain aspects, implementations in the present disclosure relate to techniques for generating an adjustment to a tracking state of a particular object based on new measurement data and a previous tracking state of that particular object, thereby focusing on the update processing of that particular object (without associating new measurement data from the whole scene with respective tracks of objects).

In some implementations, a track adjustment system may receive previous track data of an object and new measurement data from at least one sensor, and predict an adjustment to the track data based on the previous track data and the new measurement data. In some implementations, a tracker may obtain adjusted track data of the object by applying the predicted adjustment to the previous track data. In some implementations, the predicted adjustment may be generated by training a machine learning (ML) model and/or using the trained ML model. In some implementations, a trained or learned ML model may receive, as input of the ML model, measurement data from sensors and previous track data associated with the object. In some implementations, a trained or learned ML model may generate, as output of the ML model, a predicted adjustment to track data associated with the object.

In some implementations, the input measurement data may include at least one of data from a radar sensor (e.g., range rate), data from a lidar (Light Detection and Ranging) sensor, or data from a camera. In some implementations, the previous track data may represent a previous track of the object at time $t_1$, and the adjustment to track data may represent an update to the previous track at time $t_2$ that is later than $t_1$ ($t_2 > t_1$). In some implementations, the output adjustment may include information on at least one of center, extent, or orientation of a track.

In some implementations, the track adjustment system may obtain or generate an adjustment to track data of the object whenever new measurement data becomes available from sensors. In some implementations, the system may obtain or generate a track adjustment at frequency of 1 to 100 Hz. In some implementations, the system may obtain or generate a track adjustment at frequency of 1 to 60 Hz. In some implementations, the system may obtain or generate a track adjustment associated with each object among a plurality of currently tracked objects at an average frequency of 1 to 10 Hz.

According to certain aspects, embodiments in the present disclosure relate to a method includes obtaining a first track associated with an object. The method may include generating a first set of parameters based on the first track. The method may include obtaining measurement data from one or more sensors. The method may include extracting a first set of features from the measurement data. The method may include generating, based on the first set of parameters and the first set of features, a second set of parameters by a machine learning model, the second set of parameters representing an adjustment to the first set of parameters. The method may include adjusting, based on the second set of parameters, the first track to generate a second track associated with the object. The method may include providing the second track to an autonomous vehicle control system for autonomous control of a vehicle.

According to certain aspects, embodiments in the present disclosure relate to a system includes one or more processors and one or more memories operably coupled with the one or more processors. The one or more memories may store instructions that, in response to the execution of the instructions by one or more processors, cause the one or more processors to obtain a first track associated with an object. The one or more processors may generate a first set of parameters based on the first track, obtain measurement data from one or more sensors, extract a first set of features from the measurement data, generate, based on the first set of parameters and the first set of features, a second set of parameters by a machine learning model, the second set of parameters representing an adjustment to the first set of parameters, adjust, based on the second set of parameters, the first track to generate a second track associated with the object, and provide the second track to an autonomous vehicle control system for autonomous control of a vehicle.

According to certain aspects, embodiments in the present disclosure relate to at least one non-transitory computer-readable medium includes instructions that, in response to execution of the instructions by one or more processors, cause one or more processors to obtain first track associated with a first time. The one or more memories may store instructions that, in response to the execution of the instructions by one or more processors, cause the one or more processors to obtain a first track associated with an object. The one or more processors may generate a first set of parameters based on the first track, obtain measurement data from one or more sensors, extract a first set of features from the measurement data, generate, based on the first set of parameters and the first set of features, a second set of parameters by a machine learning model, the second set of parameters representing an adjustment to the first set of parameters, adjust, based on the second set of parameters, the first track to generate a second track associated with the object, and provide the second track to an autonomous vehicle control system for autonomous control of a vehicle.

Implementations in the present disclosure have at least the following advantages and benefits.

Implementations in the present disclosure can provide useful techniques for generating or obtaining an adjustment to a tracking state of a particular object based on new measurement data and a previous tracking state of that particular object. In this manner, the update processing may be focused on the tracking state of that object without collecting measurement data from the whole scene and/or associating the measurement data with respective objects in the whole scene, thereby improving the accuracy and efficiency in updating the tracking and/or identifying of the object.

Implementations in the present disclosure can provide useful techniques for training a machine learning (ML) model and/or generating an adjustment to track data using the trained ML model that receives, as input of the ML model, measurement data from a plurality of sensors (e.g., at least one lidar sensor, at least one radar sensor, and/or at least one camera) and previous track data associated with the object. The adjustment, as output of the ML model, may include at least one of center, extent, or orientation of a predicted track. In this manner, a track adjustment system according to implementations in the present disclosure can utilize, as input, measurement data from a specific sensor (e.g., range rate from a radar sensor), and generate, as output, a set of parameters that do not depend on specific sensors (e.g., center, extent, or orientation of a track associated with an object), thereby efficiently updating track data even when sensors of an autonomous vehicle can obtain measurements at multiple points with different multiple sensors.

I. System Environment for Autonomous Vehicles

FIG. 1 is a block diagram illustrating an example of a system environment for autonomous vehicles according to some implementations.

Referring to FIG. 1, an example autonomous vehicle 100 within which the various techniques disclosed herein may be implemented. The vehicle 100, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 100 may be implemented as any number of different types of vehicles, including vehicles capable of transporting people and/or cargo, and capable of traveling in various environments, and it will be appreciated that the aforementioned components 102-116 can vary widely based upon the type of vehicle within which these components are utilized.

For simplicity, the implementations discussed hereinafter will focus on a wheeled land vehicle such as a car, van, truck, bus, etc. In such implementations, the prime mover 104 may include one or more electric motors and/or an internal combustion engine (among others). The energy source may include, for example, a fuel system (e.g., providing gasoline, diesel, hydrogen, etc.), a battery system, solar panels or other renewable energy source, and/or a fuel cell system. The drivetrain 108 include wheels and/or tires along with a transmission and/or any other mechanical drive components suitable for converting the output of the prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of the vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

The direction control 112 may include one or more actuators and/or sensors for controlling and receiving feedback from the direction or steering components to enable the vehicle 100 to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 100. The brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, ships, submarines, construction equipment etc., will necessarily utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, full or semi-autonomous control over the vehicle 100 is implemented in a vehicle control system 120, which may include one or more processors 122 and one or more memories 124, with each processor 122 configured to execute program code instructions 126 stored in a memory 124. The processors(s) can include, for example, graphics processing unit(s) ("GPU(s)") and/or central processing unit(s) ("CPU(s)").

Sensors 130 may include various sensors suitable for collecting information from a vehicle's surrounding environment for use in controlling the operation of the vehicle. For example, sensors 130 can include radar sensor 134, lidar (Light Detection and Ranging) sensor 136, a 3D positioning sensors 138, e.g., a satellite navigation system such as GPS (Global Positioning System), GLONASS (Globalnaya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle in three directions. One or more encoders (not illustrated), such as wheel encoders may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. The localization subsystem 152 is principally responsible for precisely determining the location and orientation (also sometimes referred to as "pose") of the vehicle 100 within its surrounding environment, and generally within some frame of reference. The location of an autonomous vehicle can be compared with the location of an additional vehicle in the same environment as part of generating labeled autonomous vehicle data. The perception subsystem 154 is principally responsible for detecting, tracking, and/or identifying objects within the environment surrounding vehicle 100. A machine learning model in accordance with some implementations can be utilized in tracking objects. The planning subsystem 156 is principally responsible for planning a trajectory for vehicle 100 over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 100. Similarly, a machine learning model can be utilized to generate one or more signals to control an autonomous vehicle to implement the planned trajectory.

It will be appreciated that the collection of components illustrated in FIG. 1 for the vehicle control system 120 is merely exemplary in nature. Individual sensors may be omitted in some implementations. Additionally or alternatively, in some implementations, multiple sensors of types illustrated in FIG. 1 may be used for redundancy and/or to cover different regions around a vehicle, and other types of sensors may be used. Likewise, different types and/or combinations of control subsystems may be used in other implementations. Further, while subsystems 152-158 are illustrated as being separate from processor 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 100 may also include a secondary vehicle control system (not illustrated), which may be used as a redundant or backup control system for the vehicle 100. In some implementations, the secondary vehicle control system may be capable of fully operating the autonomous vehicle 100 in the event of an adverse event in the vehicle control system 120, while in other implementations, the secondary vehicle control system may only have limited functionality, e.g., to perform a controlled stop of the vehicle 100 in response to an adverse event detected in the primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 100, e.g., any cache memory in a processor, as well as any storage capacity used as a virtual memory, e.g., as stored on a mass storage device or another computer controller. One or more processors illustrated in FIG. 1, or entirely separate processors, may be used to implement additional functionality in the vehicle 100 outside of the purposes of autonomous control, e.g., to control entertainment systems, to operate doors, lights, convenience features, etc.

In addition, for additional storage, the vehicle 100 may include one or more mass storage devices, e.g., a removable disk drive, a hard disk drive, a direct access storage device ("DASD"), an optical drive (e.g., a CD drive, a DVD drive, etc.), a solid state storage drive ("SSD"), network attached storage, a storage area network, and/or a tape drive, among others.

Furthermore, the vehicle 100 may include a user interface 164 to enable vehicle 100 to receive a number of inputs from and generate outputs for a passenger or an operator, e.g., one or more displays, touchscreens, voice and/or gesture interfaces, buttons and other tactile controls, etc. Otherwise, input from a passenger or an operator may be received via another computer or electronic device, e.g., via an app on a mobile device or via a web interface.

Moreover, the vehicle 100 may include one or more network interfaces, e.g., network interface 162, suitable for communicating with one or more networks 170 (e.g., a Local Area Network ("LAN"), a wide area network ("WAN"), a wireless network, and/or the Internet, among others) to permit the communication of information with other computers and electronic device, including, for example, a central service, such as a cloud service, from which the vehicle 100 receives environmental and other data for use in autonomous control thereof. In many implementations, data collected by the one or more sensors 130 can be uploaded to a computing system 172 via the network 170 for additional processing. In some implementations, a time stamp can be added to each instance of vehicle data prior to uploading. Additional processing of autonomous vehicle data by computing system 172 in accordance with many implementations is described with respect to FIG. 2, FIG. 3 and FIG. 4.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network 170, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code". Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The exemplary environment illustrated in FIG. 1 is not intended to limit implementations disclosed herein. Indeed, other alternative hardware and/or software environments may be used without departing from the scope of implementations disclosed herein.

II. Computing Systems for Processing Autonomous Vehicle Data

Figure 2:
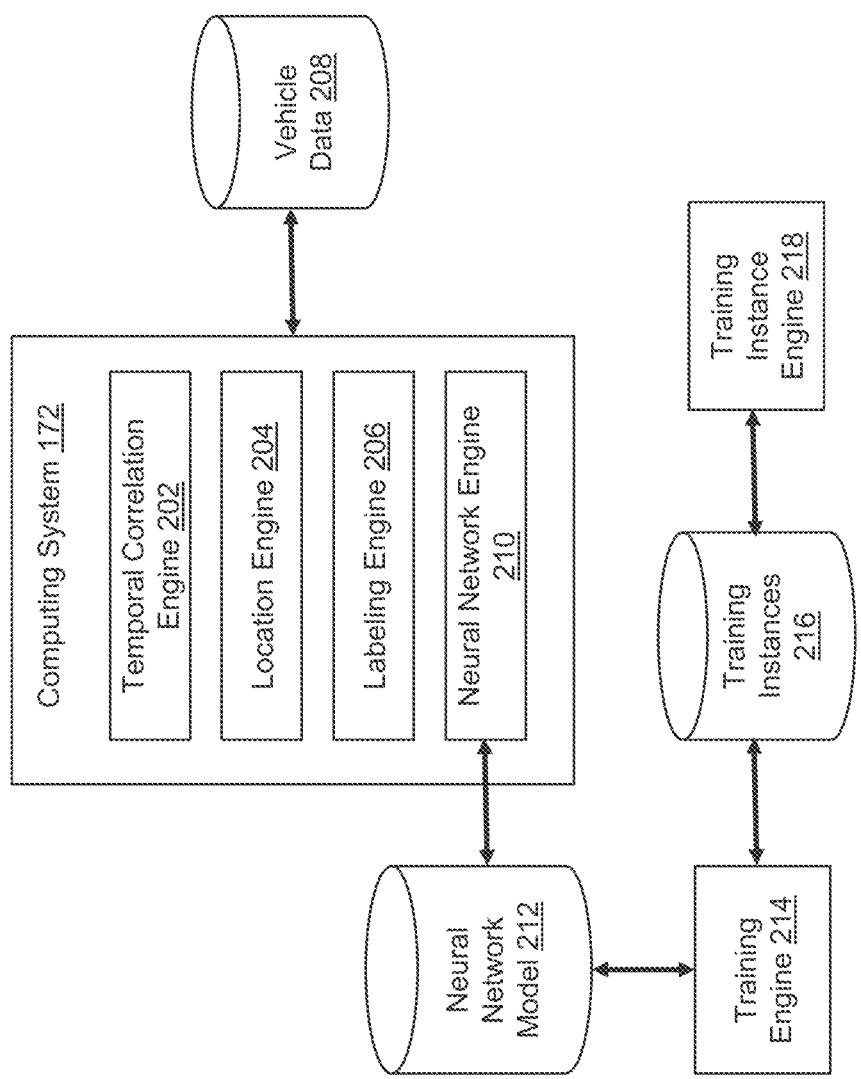
FIG. 2 is a block diagram illustrating an example of a computing system for training a neural network model according to some implementations.

FIG. 2 is a block diagram illustrating an example of a computing system for training a machine learning model such as a neural network model according to some implementations.

The computing system 172 can receive time stamped vehicle observations (i.e., a collection of vehicle data and/or environmental data collected by one or more autonomous vehicle(s) as well as one or more non-autonomous vehicle(s)) via the network 170 (see FIG. 1). In some implementations, computing system 172 may include a temporal correlation engine 202, a location engine 204, a labeling engine 206, a neural network engine 210, a training engine 214, and a training instance engine 218. The temporal correlation engine 202, location engine 204, labeling engine 206, neural network engine 210, training engine 214, and training instance engine 218 are example components in which techniques described herein may be implemented and/or with which systems, components, and techniques described herein may interface. The operations performed by one or more engines 202, 204, 206, 210, 214, 218 of FIG. 2 may be distributed across multiple computing systems. In some implementations, one or more aspects of engines 202, 204, 206, 210, 214, 218 may be combined into a single system and/or one or more aspects may be implemented by the computing system 172. For example, in some of those implementations, aspects of the temporal correlation engine 202 may be combined with aspects of the labeling engine 206. Engines in accordance with many implementations may each be implemented in one or more computing devices that communication, for example, through a communication network. A communication network may include a wide area network such as the Internet, one or more local area networks ("LAN"s) such as Wi-Fi LANs, mesh networks, etc., and one or more bus subsystems. A communication network may optionally utilize one or more standard communication technologies, protocols, and/or inter-process communication techniques.

The computing system 172 can perform a variety of processing on vehicle data 208. In some implementations, the vehicle data 208 includes time stamped autonomous vehicle data (as described herein with respect to FIG. 1). The temporal correlation engine 202 can (if necessary) synchronize time stamps between sets of data collected by separate vehicles collecting data in the same environment. For example, while two vehicles were collecting data in an environment simultaneously, the time stamps appended to the data from one vehicle may not correspond to the time stamps to the data collected from another vehicle. In some implementations, time stamps in data collected by one vehicle can be shifted to correspond to time stamps in data collected by another vehicle.

The location engine 204 can determine the proximity of vehicles within the environment (often at each time stamp) from the vehicle data 208. In some implementations, the co-presence of vehicles can be determined using one or more proximity sensors within a vehicle. In some implementations, signals from proximity sensors can indicate a wide variety of ranges including: not in range, within one meter, within five meters, within ten meters, within fifty meters, within one hundred meters, within two hundred meters, etc. In some implementations, only vehicle data where vehicles are within a threshold level of proximity may be further processed (e.g., only data from vehicles within a 250 meter range may be additionally processed).

Additionally or alternatively, vehicles can move in and out of a threshold range of proximity as they maneuver in the environment. For example, only data at time stamps where vehicles are in proximity range can be additionally processed. In some implementations, portions of vehicle data where vehicles are not in proximity can be discarded.

The location engine 204 can additionally or alternatively determine vehicle locations using vehicle data 208 along with high-definition maps built with sensory data, for example. In some implementations, 3D positioning sensor data, such as a position provided by a GPS system can localize vehicles within an environment. In other implementations, common landmarks can be used to localize the position of vehicles in an environment. Common landmarks can include a variety of objects including stationary objects such as buildings, street signs, stop signs, traffic lights, mailboxes, trees, bushes, sections of a fence, etc. The distance of an autonomous vehicle to the common landmark (e.g., using lidar data) can be determined from autonomous vehicle data. Similarly, the distance of an additional vehicle to the common landmark can be determined from the additional vehicle. A distance between the autonomous vehicle and the additional vehicle can be calculated at a specific time stamp using the distance of each vehicle to the common landmark. For example, a common landmark such as a stop sign can be captured in autonomous vehicle data as well as in non-autonomous vehicle data (which may be collected using, for example, autonomous vehicle sensor(s)

mounted on a non-autonomous vehicle). Data collected by corresponding vehicle lidar units can determine a distance from each vehicle to the stop sign at the same time stamp. The distance between the autonomous vehicle and the non-autonomous vehicle can be calculated using the distance of each vehicle to the stop sign. Additionally or alternatively, the additional vehicle can determine its location in a map using a 3D reference frame (such as an earth-centered, earth-fixed reference frame). In some implementations, an autonomous vehicle can determine its location on the same map, with respect to the same reference frame, and/or one or more additional methods of determining its location with respect to the same map as the additional vehicle.

The labeling engine 206 can generate labels (in some implementations automatically generate labels) for autonomous vehicle data using vehicle data collected from one or more additional vehicles. In some implementations, the computing system 172 can determine whether two vehicles are co-present in an environment using the location engine 204. In some implementations, the labeling engine 206 can determine instances of autonomous vehicle data which only captures a single additional vehicle co-present in the environment (i.e., when the autonomous vehicle is known to be within a proximity range of an additional vehicle, and only one vehicle is captured in the autonomous vehicle data, generally the additional vehicle will be the vehicle captured in the autonomous vehicle data). In some implementations, the labeling engine 206 can determine instances of autonomous vehicle data which captures additional non-vehicle objects co-present with the current vehicle in the environment. Data collected from the additional vehicle can be mapped to the location of the additional vehicle in the instance of autonomous vehicle data at a common time stamp. For example, a brake light signal of a non-autonomous vehicle (equipped with autonomous vehicle sensors) can be collected via a controller area network (CAN) bus and time stamped by a computing device of the non-autonomous vehicle. A label indicating the status of the brake lights of the non-autonomous vehicle can be mapped to the position where the non-autonomous vehicle is captured in autonomous vehicle data to automatically generate a brake light label for the non-autonomous vehicle at the corresponding time stamp. Additionally or alternatively, additional vehicle data identifying the non-autonomous vehicle, such as vehicle dimensions, can be used to determine a precise bounding box around the non-autonomous vehicle in the autonomous vehicle observations. In other implementations, the labeling engine 206 can utilize locations of two vehicles determined by location engine 204 (e.g., locations determined using GPS data collected from each vehicle and/or by localizing each vehicle using a common landmark(s) in the environment).

The neural network engine 210 can train a neural network model 212. The neural network model 212, in accordance with some implementations, can include a layer and/or layers of memory units where memory units each have corresponding weights. A variety of neural network models can be utilized including feed forward neural networks, convolutional neural networks, recurrent neural networks, radial basis functions, other neural network models, as well as combinations of several neural networks. Additionally or alternatively, the neural network model 212 can represent a variety of machine learning techniques in addition to neural networks such as support vector machines, decision trees, Bayesian networks, other machine learning techniques, and/or combinations of machine learning techniques. Training the neural network model 212 in accordance with some implementations described herein can utilize the neural network engine 210, training engine 214, and training instance engine 218. Neural network models can be trained for a variety of autonomous vehicle tasks including determining a target autonomous vehicle location, generating one or more signals to control an autonomous vehicle, tracking or identifying objects within the environment of an autonomous vehicle, etc. For example, a neural network model can be trained to identify traffic lights in the environment with an autonomous vehicle. As a further example, a neural network model can be trained to predict the make and model of other vehicles in the environment with an autonomous vehicle. In many implementations, neural network models can be trained to perform a single task. In other implementations, neural network models can be trained to perform multiple tasks.

The training instance engine 218 can generate training instances to train the neural network model. A training instance can include, for example, an instance of autonomous vehicle data where the autonomous vehicle can detect an additional vehicle using one or more sensors and a label corresponding to data collected from the additional vehicle. The training engine 214 may apply a training instance as input to neural network model 212. In some implementations, the neural network model 212 can be trained using at least one of supervised learning, unsupervised learning, or semi-supervised learning. Additionally or alternatively, neural network models in accordance with some implementations can be deep learning networks including recurrent neural networks, convolutional neural networks (CNN), networks that are a combination of multiple networks, etc. For example, the training engine 214 can generate a predicted neural network model output by applying training input to the neural network model 212. Additionally or alternatively, the training engine 214 can compare the predicted neural network model output with a neural network model known output from the training instance and, using the comparison, update one or more weights in the neural network model 212. In some implementations, one or more weights may be updated by backpropagating the difference over the entire neural network model 212.

Figure 3:
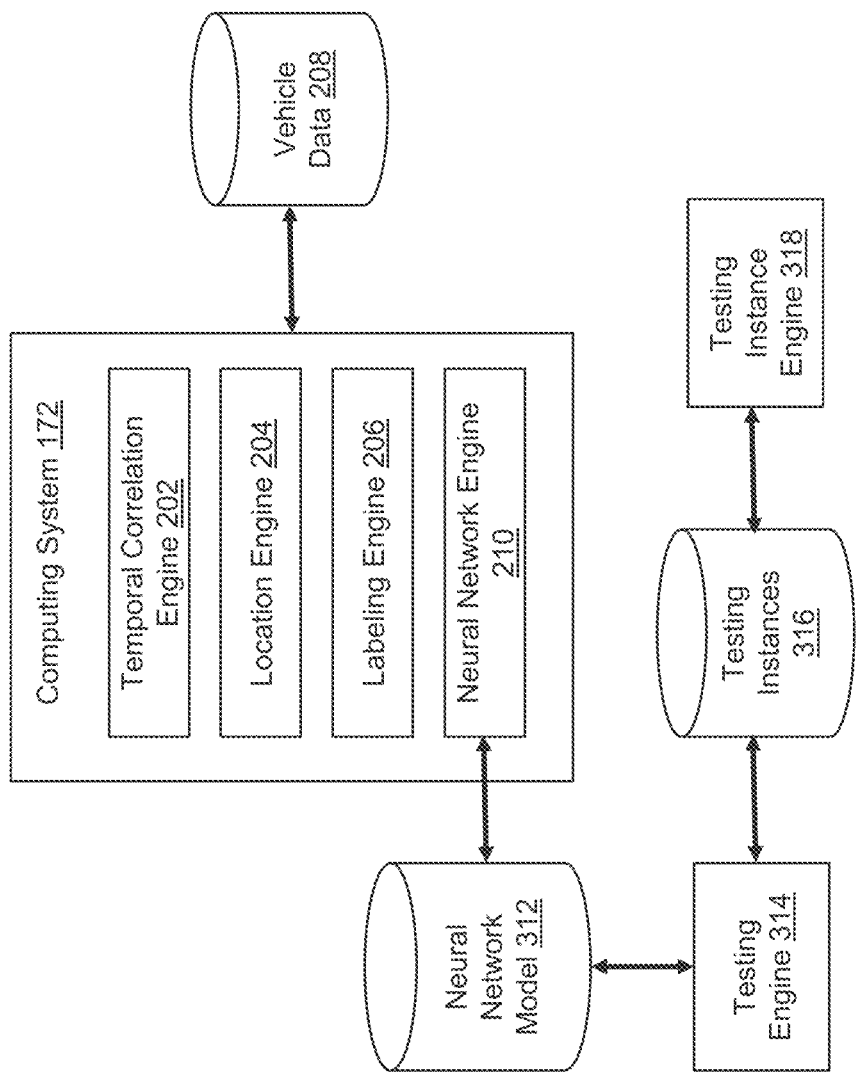
FIG. 3 is a block diagram illustrating an example of a computing system for testing a neural network model according to some implementations.

FIG. 3 is a block diagram illustrating an example of a computing system for testing a trained neural network model according to some implementations. The computing system 172, temporal correlation engine 202, location engine 204, labeling engine 206, and vehicle data 208 are described in the foregoing sections with respect to FIG. 2. The neural network engine 212, testing engine 314, and testing instance engine 318 in accordance with some implementations can be utilized to generate testing instances for autonomous vehicle data including a label corresponding to an additional vehicle or a non-vehicle object present in the autonomous vehicle data, as well as to test a trained (or learned) neural network model 312. In some implementations, the trained neural network model 312 can generate a predicted output for a single autonomous vehicle task. In other implementations, the trained neural network model 312 can generate a predicted output for multiple autonomous vehicle tasks. Testing instance engine 314 can generate testing instances 316 using labeled autonomous vehicle data collected from an autonomous vehicle and an additional vehicle (or a non-vehicle object), performing the specific autonomous vehicle task the neural network model 312 is trained for.

A testing instance, for example, can include an instance of autonomous vehicle data where an additional vehicle (or a non-vehicle object) is detected by one or more sensors of the autonomous vehicle, and a label corresponding to data collected by the additional vehicle. The testing engine 314 can apply a testing instance as input to the neural network model 312. A predicted output generated by applying a testing instance to the neural network model 312 can be compared with a known output for the testing instance (i.e., a label generated by the labeling engine 206) to update an accuracy value (e.g., an accuracy percentage) for the neural network model.

Figure 4:
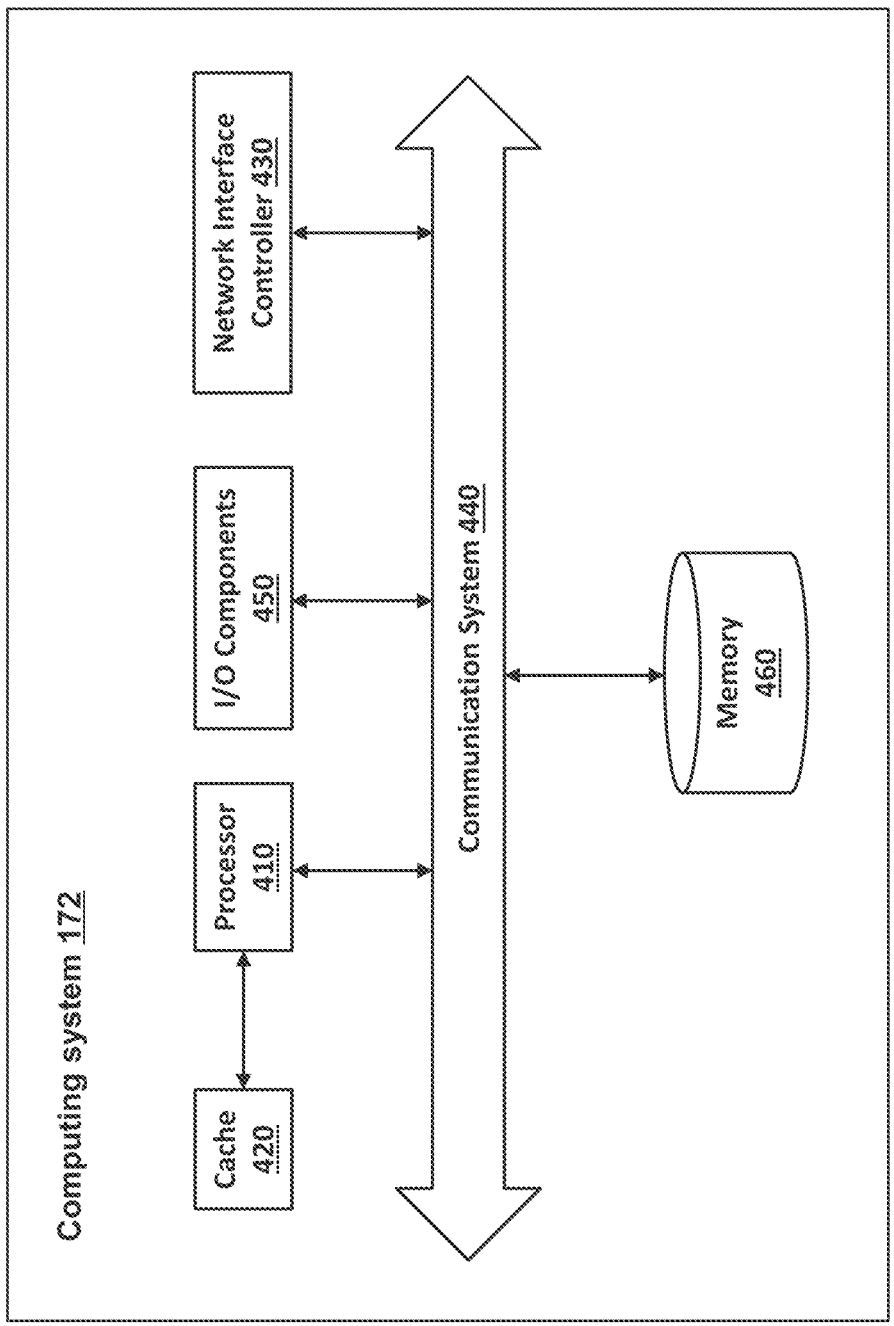
FIG. 4 is a block diagram illustrating an example of a computing system according to some implementations.

FIG. 4 is a block diagram illustrating an example of a computing system according to some implementations.

Referring to FIG. 4, the illustrated example computing system 172 includes one or more processors 410 in communication, via a communication system 440 (e.g., bus), with memory 460, at least one network interface controller 430 with network interface port for connection to a network (not shown), and other components, e.g., an input/output ("I/O") components interface 450 connecting to a display (not illustrated) and an input device (not illustrated). Generally, the processor(s) 410 will execute instructions (or computer programs) received from memory. The processor(s) 410 illustrated incorporate, or are directly connected to, cache memory 420. In some instances, instructions are read from memory 460 into the cache memory 420 and executed by the processor(s) 410 from the cache memory 420.

In more detail, the processor(s) 410 may be any logic circuitry that processes instructions, e.g., instructions fetched from the memory 460 or cache 420. In some implementations, the processor(s) 410 are microprocessor units or special purpose processors. The computing device 400 may be based on any processor, or set of processors, capable of operating as described herein. The processor(s) 410 may be single core or multi-core processor(s). The processor(s) 410 may be multiple distinct processors.

The memory 460 may be any device suitable for storing computer readable data. The memory 460 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 172 may have any number of memory devices as the memory 460.

The cache memory 420 is generally a form of computer memory placed in close proximity to the processor(s) 410 for fast read times. In some implementations, the cache memory 420 is part of, or on the same chip as, the processor(s) 410. In some implementations, there are multiple levels of cache 420, e.g., L2 and L3 cache layers.

The network interface controller 430 manages data exchanges via the network interface (sometimes referred to as network interface ports). The network interface controller 430 handles the physical and data link layers of the OSI model for network communication. In some implementations, some of the network interface controller's tasks are handled by one or more of the processor(s) 410. In some implementations, the network interface controller 430 is part of a processor 410. In some implementations, a computing system 172 has multiple network interfaces controlled by a single controller 430. In some implementations, a computing system 172 has multiple network interface controllers 430. In some implementations, each network interface is a connection point for a physical network link (e.g., a cat-5 Ethernet link). In some implementations, the network interface controller 430 supports wireless network connections and an interface port is a wireless (e.g., radio) receiver/transmitter (e.g., for any of the IEEE 802.11 protocols, near field communication "NFC", Bluetooth, ANT, or any other wireless protocol). In some implementations, the network interface controller 430 implements one or more network protocols such as Ethernet. Generally, a computing device 172 exchanges data with other computing devices via physical or wireless links through a network interface. The network interface may link directly to another device or to another device via an intermediary device, e.g., a network device such as a hub, a bridge, a switch, or a router, connecting the computing device 172 to a data network such as the Internet.

The computing system 172 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 172 may include an interface (e.g., a universal serial bus (USB) interface) for connecting input devices, output devices, or additional memory devices (e.g., portable flash drive or external media drive). In some implementations, a computing device 172 includes an additional device such as a co-processor, e.g., a math co-processor can assist the processor 410 with high precision or complex calculations.

Figure 5:
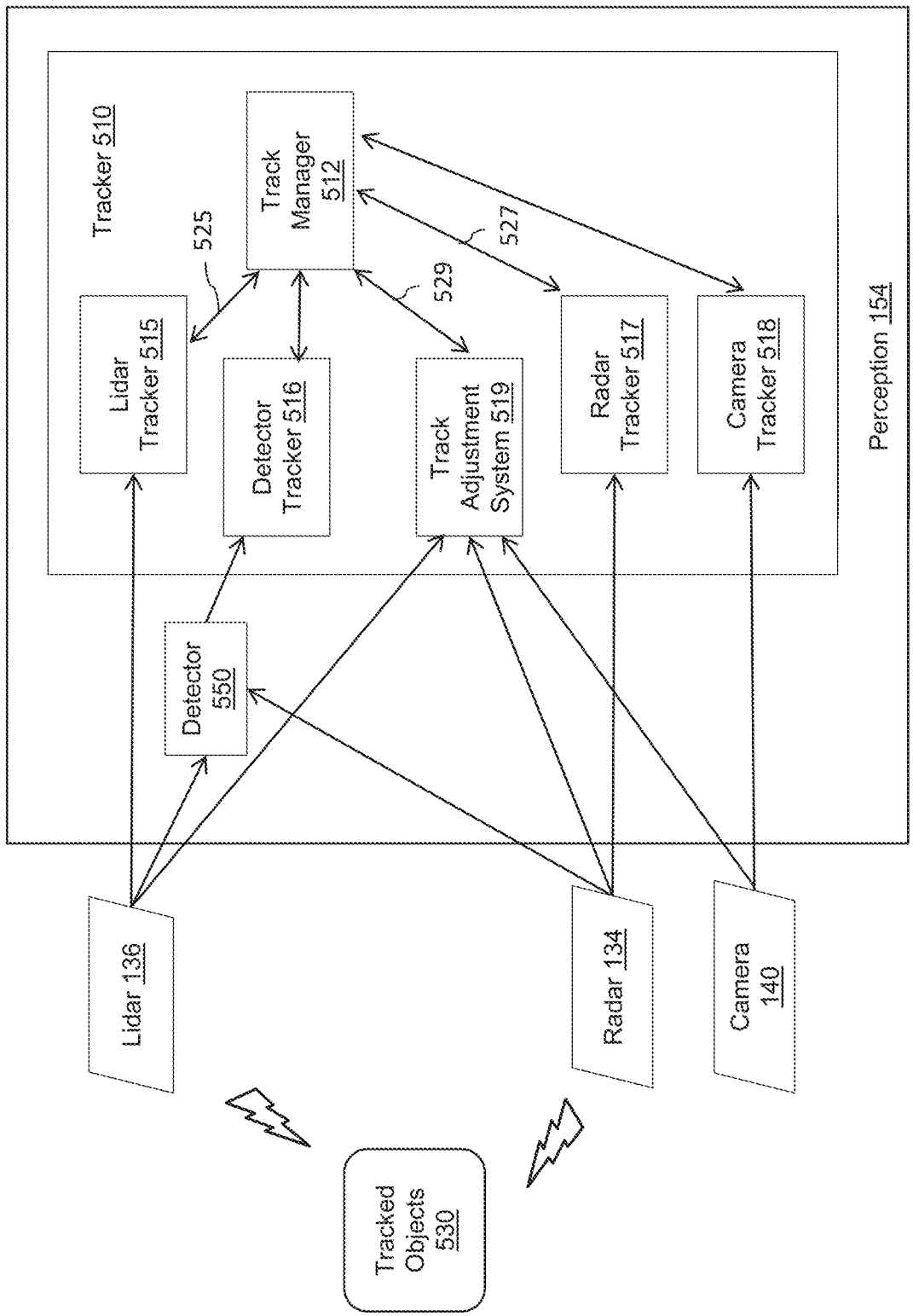
FIG. 5 is a block diagram illustrating an example of a perception subsystem according to some implementations.

III. System and Methods for Generating Data Using Learned Radar Observation Models FIG. 5 is a block diagram illustrating an example of a perception subsystem according to an exemplary implementation of the present disclosure.

The perception subsystem 154 is responsible for detecting, tracking, determining, and/or classifying objects within the environment surrounding the vehicle 100 (see FIG. 1). In some implementations, the perception subsystem 154 may include at least one of a detector 550 (or a plurality of detectors 550) and a tracker 510. In some implementations, the perception subsystem 154 can include multiple detectors that receives sensor data from respective sensors.

The detector 550 is principally responsible for determining and/or detecting objects within the environment surrounding the vehicle based on sensor data received from sensors. In some implementations, the detector 550 may receive data from sensors (e.g., lidar data from the lidar sensor 136 or a plurality of lidar sensors 136, radar data from the radar sensor 134 or a plurality of radar sensors 134) and process the received sensor data to determine and/or detect objects. In some implementations, the detector 550 may be one or more detectors corresponding to respective different kinds of sensors, or a single detector receiving data from different kinds of sensors, or multiple detectors each receiving data from different kinds of sensors. In some implementations, the detector 550 may be configured to classify an object into a particular category based on sensor data received from the one or more sensors (e.g., using one or more machine learning models to classify an object into a particular category). In some implementations, the detector 550 may determine features related to an object based on sensor data. For example, the detector 550 can determine a size, a shape, a velocity, or a moving direction of an object. In some implementations, the detector 550 may output the determined classification or the determined features of an object to be input to the tracker 510.

In some implementations, output from the detector 550 may include data relating to detections and/or data relating to predictions. Detections data may include 3 dimensional (3D) oriented boxes for detected objects (e.g., pedestrians, cyclists, vehicles, etc.). In some implementations, motorcyclists may be labeled as vehicles. In some implementations, the detector 550 may perform detections inside a spatial grid of predetermined dimensions which may contain a plurality of cells. Predictions data may include 2 dimensional (2D) spatial grids containing information about objects for which the detector do not obtain sufficient or complete shape representations or motion models. The grids may contain at least one of an obscurant grid, a velocity grid or a vegetation grid. The obscurant grid may represent a probability that each cell is an obscurant (e.g., exhaust, rain, etc.). The velocity grid may represent a ballistic 2D velocity vector indicating how objects contained in each cell are moving. The vegetation grid may represent a probability that each cell is vegetation. In some implementations, the velocity grid and the vegetation grid may not yet be predicted by the detector. In some implementations, all grids may contain information relating to sensor data contained in each cell (e.g., min/max z values, timestamps, measured from a lidar sensor). In some implementations, the contents of a grid may be used by a sensor buffer to remove spurious lidar data (e.g., obscurant grid), tag ephemerals (e.g., moving matter apart from tracked objects) with velocity values (e.g., velocity grid), or inform a static raster based on the contents of a grid (e.g., vegetation grid).

The tracker 510 is principally responsible for tracking objects (e.g., objects 530) within the environment surrounding the vehicle 100. In some implementations, the tracker 510 may be configured to associate consecutive sensor observations (e.g., radar points in cloud points measured by a radar sensor) of an object and generate a track based on the sensor observations.

In some implementations, the tracker 510 may include a track manager 512 which initiates and/or updates a track associated with the object based on changes of the target objects. In some implementations, the tracker 510 may include a radar tracker 517, while in some implementations the radar tracker 517 may be separate from the tracker 510. In some implementations, where the radar measurement data are encoded in a certain format, the radar tracker 517 can decode and convert radar measurement data (e.g., radar points received from the radar sensor 134 or a plurality of radar sensors 134) into a different format. For example, the radar tracker 517 can add certain channels to the format of the radar measurement data such that additional data can be associated with the additional channels that are included in the different format. In some implementations, the radar tracker 517 determines tracks of different objects (e.g., present position and velocity of different objects), and outputs radar points associated with tracks of different objects to be input to the track manager 512. In some implementations, in response to a request for up-to-date radar measurement data from the track manager 512, the radar tracker 517 may be configured to output track data based on radar points of up-to-date radar measurements, to be input to the track manager 512. In some implementations, the radar tracker 517 may be configured to send updates 517 to the track manager 512 to inform a new position and a range rate of a track, which can be integrated in the track manager 512 or the tracker 510.

In some implementations, the tracker 510 may include a detector tracker 516 which receives detection data from the detector 550 and outputs data of a track of the newly detected object (e.g., position and velocity data) to be input to the track manager 512. In some implementations, the detector tracker 516 may be separate from the tracker 510. In some implementations, the detector tracker 516 may associate detections with existing tracks to update position, velocity and extents, for example, which are integrated in the track manager 512 or the tracker 510.

In some implementations, the tracker 510 may include a lidar tracker 515 which converts lidar measurement data (e.g., reflected laser measured by the lidar sensor 136 or a plurality of lidar sensors 136) to points or a surface in a 3D environment, and output the points or surface to be input to the track manager 512. In some implementations, the lidar tracker 515 may be separate from the tracker 510. In some implementations, the lidar tracker 515 may send updates 525 to the track manager 512 to inform visibility information (via ray tracing, for example) on if a track really exists in the world. For example, using visibility information such as the ray hits/misses, the tracker 510 may remove tracks that are not supported by lidar data (e.g., remove tracks spawned from radar returns on overpasses). The tracker 510 may include a camera tracker 518 which converts images captured by a camera (e.g., the camera 140 or a plurality of cameras 140) to points or a surface in a 3D environment, and output the points or surface to be input to the track manager 512. In some implementations, the camera tracker 518 may be separate from the tracker 510.

In some implementations, the tracker 510 may include a tracker adjustment system 519 which receives previous track data 529 of an object from the track manager 512 and new measurement data from at least one sensor (e.g., sensors 134, 136, 140), predict an adjustment to the track data based on the previous track data and the new measurement data, and send the predicted adjustment 529 to the track manager 512. In some implementations, the tracker adjustment system 519 may be separate from the tracker 510 (see FIG. 6, for example). In some implementations, the tracker 510 or the track manager 512 may obtain adjusted track data of the object by applying the predicted adjustment to the previous track data. In some implementations, the predicted adjustment may be generated by training a machine learning (ML) model (e.g., training the model 212 by the training engine 214 in FIG. 2) and/or using the trained ML model. In some implementations, a trained or learned ML model (e.g., trained model 312 in FIG. 3) may receive, as input of the ML model, measurement data from sensors and previous track data associated with the object. In some implementations, a trained or learned ML model (e.g., trained model 312 in FIG. 3) may generate, as output of the ML model, a predicted adjustment to track data associated with the object.

Figure 6:
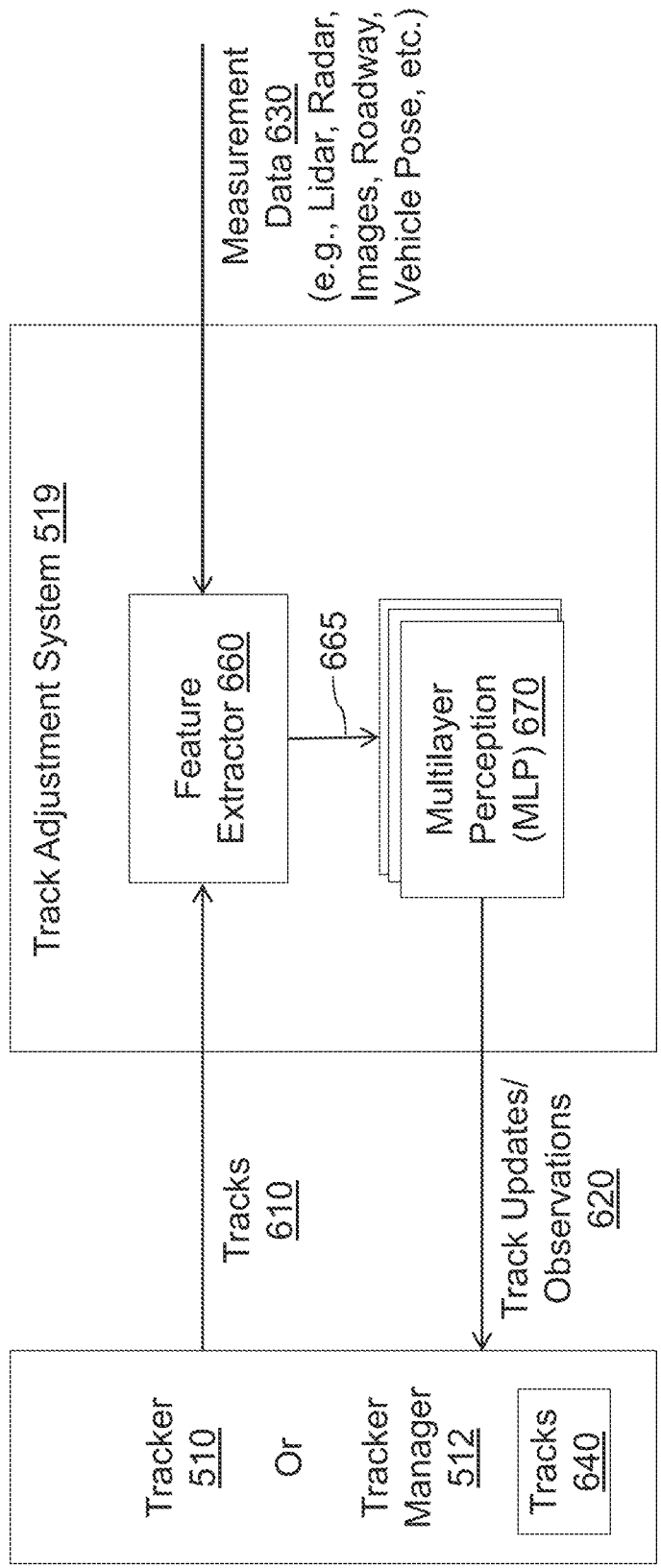
FIG. 6 is a block diagram illustrating an example of a track adjustment system according to an exemplary implementation of the present disclosure.

FIG. 6 is a block diagram illustrating an example of a track adjustment system according to an exemplary implementation of the present disclosure.

In some implementations, the track adjustment system 519 may use a track adjustment model to adjust input tracks (e.g., tracks 610 in FIG. 6) to a state observed with measurement data from sensors (e.g., lidar and radar sensor data or camera data). In some implementations, the track adjustment system 519 may be a system within the tracker 510 (see FIG. 5) while in some implementations, the track adjustment system 519 may be a system separate from the tracker 510 (see FIG. 6). Referring to FIG. 5, the lidar tracker 515, the detector tracker 516, the tracker adjustment system 519, the radar tracker 517, the camera tracker 518 may form a tracker constellation in which each tracker may have a bidirectional relationship with the tracker manager 512, for example, bidirectional links 525, 529, 527 representing (1) tracks sent from the track manager 512 to the tracker constellation and (2) updates sent from the tracker constellation to the track manager 512. The track manager 512 may be configured to perform a centralized management on tracks and updates.

In some implementations, the track adjustment system 519 may subscribe to tracks (so as to receive tracks 610 from the tracker or the track manager) and publish or send track updates/observations messages 620 to the tracker or the track manager. In some implementations, the tracks 610 may be a previous track of an object at time $t_1$, and the updates/observations messages 620 may represent an adjustment or an update to the previous track at time $t_2$ that is later than $t_1$ ($t_2 > t_1$). In some implementations, the output adjustment or update may include information on at least one of center, extent, or orientation of a track. In some implementations, the track adjustment system 519 may predict adjustments to a canonical shape of an input track (for example, center, extent, or orientation of a track associated with an object). In some implementations, the track adjustment system 519 may predict an observed shape of the track (e.g., a shape of a vehicle) and output an overhead 2D raster, where each cell in the raster represents whether or not points in the corresponding column of 3D space are associated with the input track. In some implementations, the track adjustment system may obtain or generate an adjustment to track data of the object whenever new measurement data becomes available from sensors. In some implementations, the track adjustment system may obtain or generate a track adjustment at frequency of 1 to 100 Hz. In some implementations, the system may obtain or generate a track adjustment at frequency of 1 to 60 Hz. In some implementations, the system may obtain or generate a track adjustment associated with each object among a plurality of currently tracked objects at an average frequency of 1 to 10 Hz.

In some implementations, the track adjustment system 519 may collect, as data inputs, measurement data 630 (e.g., lidar data, radar data, images, roadway (from map data), vehicle pose (3D shape data)), extract features 665 via a feature extractor 660, run or execute a multilayer perception (MLP) 670 (e.g., a machine learning (ML) model or a learned neural network model) that inputs the features 665 and outputs the track updates/observations messages 620. The measurement data 630 may be associated with time $t_2$ that is later than $t_1$ ($t_2 > t_1$). For example, the measurement data 630 may be measured at time $t_2$ or contain data associated with time $t_2$. In some implementations, a neural network model may be trained using a track adjustment model described below (with reference to FIG. 7A to FIG. 10) in a manner explained above with reference to FIG. 2. In some implementations, the learned or trained neural network model as MLP 670 may be tested in a manner explained above with reference to FIG. 3.

In some implementations, the track adjustment system 519 may predict or estimate a state of tracks at a reference timestamp (e.g., track at time $t_2$ which is later than $t_1$) based on input tracks (e.g., input track at time $t_1$) by performing data extraction and model inference in the frame of input tracks forward-predicted to the reference timestamp. In some implementations, the state of tracks may include at least one of heading angle, center x, center y, length, width, heading rate, velocity, or track validity.

In some implementations, the feature extractor 660 may extract features from the tracks 610 or the measurement data 630, to be input to the MLP 670. In some implementations, there may be at least four types of input features to the MLP 670: (1) track or automotive vehicle (AV) metadata; (2) lidar points; (3) radar points; (4) Hough points.

The features of track or AV metadata may represent information that can answer such questions as "where is the track relative to the AV? On the left? Are we viewing the track head on? Or from the side?" or "where is the roadway relative to the track" or "is the track on the road?" The features of lidar points may be extracted from raw lidar data 630 sent from a lidar sensor (e.g., lidar sensor 136 in FIG. 5). In some implementations, the raw lidar data then may be transformed into at least three 2D images: (1) a top down height map; (2) a first height map from a view looking directly at the track; (3) a first height map from a side of the track. For example, the top down height map can provide an image of a car seen from the air while the other two maps can provide views of the track from the point of a person standing on the ground. In some implementations, these images as features can be directly input to a core of a multilayer perception system (e.g., MLP 670).

In some implementations, the feature extractor 660 may feed radar points into a model (not shown) for processing a set of points (e.g., PointNet) which can voxelize the radar points into a fixed dimensional representation (as a feature) that is input into a core of a multilayer perception system (e.g., MLP 670). In some implementations, the feature extractor 660 may run or execute a Hough transform on a top down height map view of lidar points, for example, to obtain Hough points. The feature extractor 660 may then feed the Hough points into a model (not shown) for processing a set of points (e.g., PointNet) which can voxelize the Hough points into a fixed dimensional representation (as a feature) that is input into a core of a multilayer perception system (e.g., MLP 670). With such features of Hough points, the track adjustment system can achieve an improved sensitivity to the angle of vehicles, as the Hough transform can perform an accurate measurement of the angles of apparent surfaces. In some implementations, the feature extractor 660 may provide features (e.g., features 665) in canonical frame, which is a scaled track frame, as input to the MLP 670. For example, the canonical frame of the features may represent a canonical shape of an input track (e.g., center, extent, or orientation of a track associated with an object).

In some implementations, the MLP 670 may include fully connected layers and relu activations. In some implementations, the MLP 670 may include, as a core model, a plurality of decoder (attention) heads that output track updates/observations in multiple aspects (e.g. vehicle angle, center position, speed, log-odds of being a valid object, etc.). In some implementations, the MLP 670 may include an image classifier, which may be part of a non-core model of the MLP 670 in some implementations. This classifier may take as input an image of each track (if one is available) and output a delta log-odds value, which may be added to the log-odds output of the core model to produce the final "log-odds the track is valid". In some implementations, the image classifier may be a convolutional neural network (CNN) image classifier that runs or executes a plurality of conv/batch_norm/relu/pool layers.

In some implementations, after receiving the updates/observations messages 620 from the track adjustment system 519, the tracker 510 or the tracker manager 512 may adjust the tracks 510 based on the updates/observations messages 620 to generate a second track 640 associated with time $t_2$ which is later than $t_1$. In some implementations, the perception subsystem 154 may provide the second track associated with time $t_2$ to the vehicle control system 120 (see FIG. 1) so as to control various controls in the vehicle control system 120 in order to implement a planned trajectory of a vehicle (e.g., vehicle 100 in FIG. 1).

Figure 7:
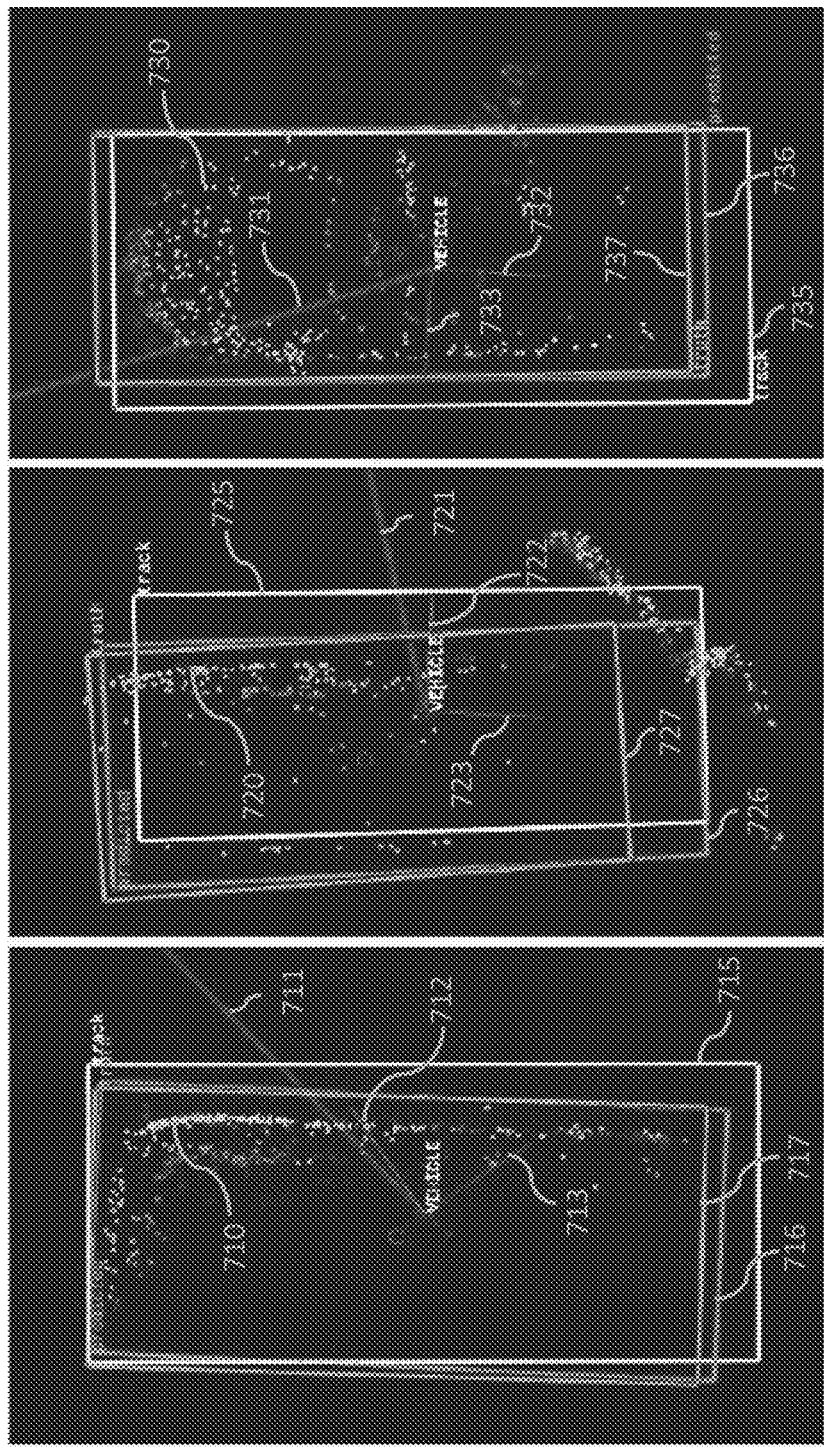
FIG. 7A to FIG. 7C are diagrams illustrating an example of a predicted track predicted based on an input track and sensor measurement data according to an exemplary implementation of the present disclosure.

FIG. 7 is a diagram illustrating an example of a predicted track predicted based on an input track and sensor measurement data according to an exemplary implementation of the present disclosure. FIG. 7A to FIG. 7C show input track boxes 715, 725, 735 indicating input tracks, predicted track boxes 716, 726, 736 indicating tracks predicted by a track adjustment system based on measurement data 710, 720, 730, and labeled ground truth track boxes 717, 727, 737 indicating ground truth tracks.

In some implementations, 2D coordinate frames for boxes can be defined as follows. Input track frames for an input track (e.g., a track prior that is passed into the system) can be defined such that the frame origin is at the center of the input track, the x-axis 713, 723, 733 is aligned with the input track heading (and the y-axis 712, 722, 732 is also shown), and the scale is in real-world meters, e.g. 1 unit=1 meter. For example, the x-axis points out a front of a vehicle. Canonical frames may have the same origin and axes as the input track frame, but can be scaled such that the input track has unit corners, e.g., the upper-left corner is at (1, 1). The features input to a track adjustment model may be transformed to a 3D version of this frame, in which the upper-left-top corner of the input track is at (1, 1, 1), but the box adjustments to height (e.g., z-axis 711, 721, 723) are not predicted. Predicted track frames for a predicted track (e.g., a track resulting from the predicted S2A adjustment to the input track) can be defined such that the origin is at the track center predicted by the track adjustment system and the x-axis is aligned with the predicted track heading. The scale is in meters, for example. In the following descriptions, input track box, predicted track box, and ground truth track box (or label) will be denoted with "i" subscript, "p" subscript and "l" subscript, respectively.

In some implementations, the track adjustment system may perform a parameterization to obtain an observation of (or adjustment or update to) a track associated with an object. That is, the track adjustment system may find or obtain a set of parameters to estimate the state of vehicles and cyclists as boxes and the state of pedestrians as points. For example, for pedestrians, the track adjustment system or a ML model therein may predict an (x,y) translation that moves the track center to the true center, and/or predict the standard-deviation of a translation error, which applies to both x and y components of the translation. A translation may represent a distance between a particular portion (e.g., center) of a first box and a particular portion (e.g., center) of a second box. The track adjustment system may additionally estimate a track validity score for all categories (e.g., vehicles, cyclists, pedestrians, etc.). This validity score may indicate how likely it is that this observation (or adjustment or update) was made on a real object consistent with the track. Larger values may indicate higher confidence in the validity of the observation, with values>=1 indicating absolute certainty, for example. In particular, given a set S of observations, if all observations with the track validity score>=R are selected, for any R in the range [0,1], then at least (1−R) fraction of the truly valid observations in S can be obtained.

Figure 8:
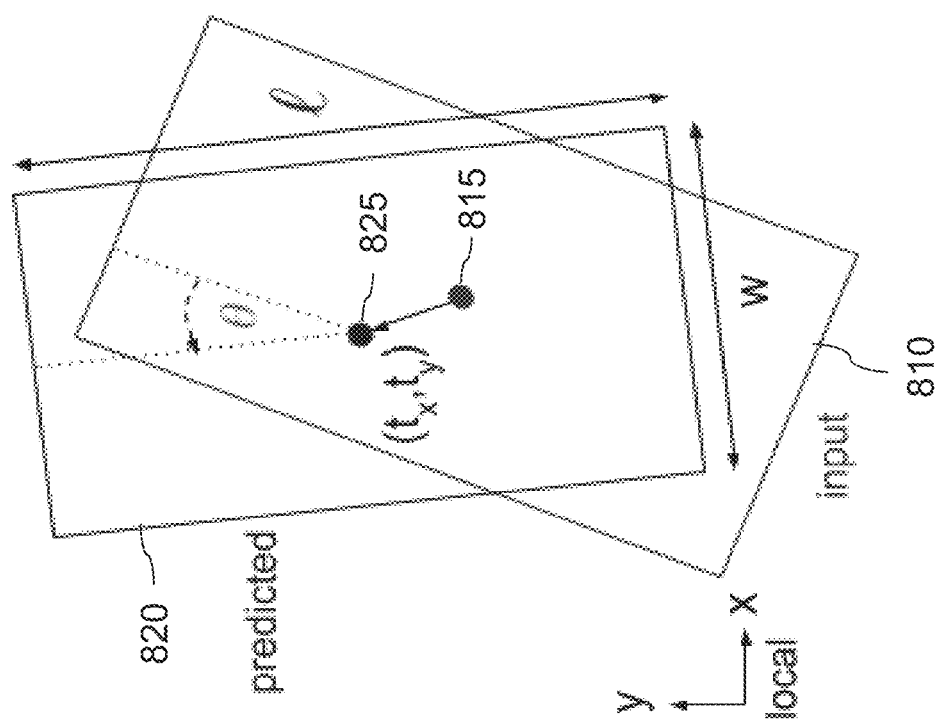
FIG. 8 is a diagram illustrating an example of a track adjustment model according to an exemplary implementation of the present disclosure.

FIG. 8 is a diagram illustrating an example of a track adjustment model according to an exemplary implementation of the present disclosure. In some implementations, a track adjustment system may use a track adjustment model that can predict a 2D box (e.g., a predicted box 820) as an adjustment to an input track box (e.g., an input box 810). For example, the adjustment may include at least one of center translation (e.g., translation $(t_x, t_y)$ from center 815 to center 825), tangent of angle (e.g., tangent of the angle $\theta$ in FIG. 8), width of the predicted box (e.g., w in FIG. 8), or length of the predicted box (e.g., l in FIG. 8).

In the following sections, different embodiments of track adjustment models will be described.

1. First Example

In some implementations, a track adjustment model (e.g., a model used by MLP 670 in FIG. 6) can be expressed as an adjustment in a (2D) local frame which is a projection of an AV local frame onto the x-y plane at z=0 (the scale is in meters). In some implementations, the track adjustment model can output a predicted 2D box (e.g., a predicted box 820) as an adjustment to an input track box (e.g., an input box 810), where the input track box can be associated with one or more parameters including (1) an angle $\theta$ to rotate an input box such that the heading of the input box matches the predicted box (see FIG. 8), (2) a translation $t=(t_x, t_y)$ from input box to the predicted box in a 2D local frame, and (3) extents (l, w) of the predicted box (e.g., length and width of the predicted box).

The input track corners in local frame can be mapped to predicted track corners in local frame by (1) applying a first transformation to the input track corners in local frame from an input track frame in 2D (local_frame_from_input_track), can equivalently be a transformation to local frame from a canonical frame (local_frame_from_canonical) or any other transform from a track-centered frame in which the track heading is aligned with the x-axis; (2) applying predicted extents, e.g., using a 4×4 matrix, to obtain an input track corner; and (3) applying a matrix that rotates a point by the angle $\theta$ and then applying the translation t, to obtain the predicted track corners.

In some implementations, the track adjustment model may compute the transform to the predicted track frame from local frame (pred_from_local) by (1) applying the first transformation; (2) applying a planar translation with the translation t and a rotation transformation with the angle $\theta$ to obtain a second transform; and (3) calculating an inverse of the second transform to obtain the transform pred_from_local.

In some implementations, the track adjustment system (e.g., system 519) or tracker (e.g., tracker 510) can compute transformations from outputs of MLP 670 (e.g., learned neural network) in canonical frame to an output box parameterization in local frame. In some implementations, referring to FIG. 8, after extracting features, the track adjustment system may apply a 2-layer MLP (e.g., DecodeRegressionOutput) to the features (e.g., an input box 810) to compute outputs in canonical frame (e.g., a predicted box 820), including, for example, at least one of center translation (e.g., translation t from center 815 to center 825), tangent of the angle in canonical frame (e.g., tangent of the angle $\theta$ in FIG. 8), canonical width (e.g., w in FIG. 8), and/or canonical length (e.g., l in FIG. 8). Then, the track adjustment system or the tracker may transform the outputs from canonical frame to local frame using, for example, the first transformation t. In some implementations, the track adjustment system or the tracker may scale the canonical extents (e.g., width and length thereof) by the input track extents to produce the predicted extents, scale the predicted tangent of the canonical frame angle by the input track width/length ratio, and/or transform the canonical center prediction to local frame using a stored affine transform (e.g., local_frame_from_track_canonical). In some implementations, the track adjustment system or the tracker may compute the translation in local frame by computing the predicted center in local frame and solving for translation t such that an adjustment (e.g., rotating a point by the angle θ and translating by the translation t) can be applied to transform a point on the input track (such as a corner) to the corresponding point on the predicted track. For example, the point on the input track can be rotated by the angle θ and then translated by the translation t, thereby obtaining the predicted track corners. A difference between the predicted track corners and a predicted track center can be obtained by rotating a difference between the input track corners and an input tracker center, by the angle θ. The translation t can be obtained by subtracting, from the predicted track center, a point obtained by rotating the input track center by the angle θ.

In some implementations, the track adjustment system (e.g., system 519) may calculate loss of an adjustment, e.g., difference between the predicted track and ground truth track, which includes at least one of translation loss, angle loss, or extent loss. In some implementations, the adjustment loss may be used by the training engine 214 (see FIG. 2) to train a machine learning model (e.g., MLP 670). The training engine can use the adjustment loss to evaluate how well the machine learning model fits the given training samples so that the weights of the model can be updated to reduce the loss on the next evaluation.

To calculate the translation loss, the track adjustment system may first compute the predicted track center $c_p$ by applying the adjustments (e.g., rotating a point by the angle θ and translating by the translation t) to the input track center in local frame.

The track adjustment system may also apply the adjustments (e.g., rotating a point by the angle θ and translating by the translation t) in local frame to a point along the input track heading, referred to as "track front" or $f_i$. In the present disclosure, input track box, predicted track box, and ground truth track box (or label) will be denoted with "i" subscript, "p" subscript and "l" subscript, respectively.

Using the track front $f_i$, the track adjustment system can calculate a point along the predicted track heading, denoted by $f_p$, by applying the adjustments (e.g., rotating a point by the angle θ and translating by the translation t) to the track front $f_i$.

The track adjustment system may compute a transform that rotates x-axis of local frame to x-axis of the predicted track frame by using the angle α of the predicted track heading direction vector, which is equal to a difference between the predicted track heading and the predicted track center. The angle α may be an angle of the predicted track heading direction vector relative to the x-axis. A local-to-predicted transform may be defined as a rotation by the angle (−α). In some implementations, assuming that dx and dy are x-coordinate and y-coordinate of the predicted track heading direction vector, α=atan2(dy, dx) when dx=0.

Then, the track adjustment system may transform the predicted track center and the label center from local frame to predicted track frame by applying the local-to-predicted transform and then translating by a local-to-predicted translation from local frame to predicted track frame. In some implementations, the track adjustment system does not apply the local-to-predicted translation because the loss would be the same as if it did, since both the label center and the predicted center are translated by the same amount. Then, the track adjustment system may calculate translation loss (e.g., translation loss in x-axis and y-axis) by separately computing (1) the negative log likelihood on x component of the label and x component of predicted distribution and (2) the negative log likelihood on y component of the label and y component of predicted distribution.

Figure 9:
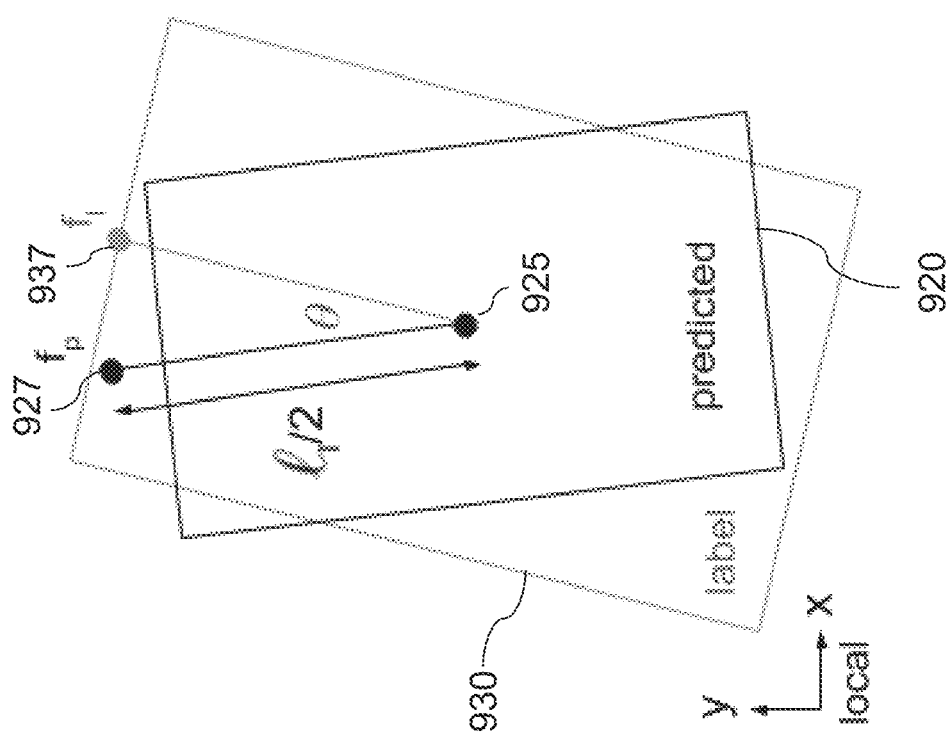
FIG. 9 is a diagram illustrating an example of angle losses according to an exemplary implementation of the present disclosure.

FIG. 9 is a diagram illustrating an example of angle losses according to an exemplary implementation of the present disclosure. In some implementations, to compute an angle loss, the track adjustment system may calculate sigma (e.g., standard deviation of a normal distribution) on a point at the end of a ray ($\sigma_f$) by using an approximation based on (1) sigma on the angle of that ray and (2) the length of that ray (e.g., multiplying the sigma on the angle of that ray by the length of that ray). This is a good approximation so long as the angle sigma is not so big that it begins to "wrap around" the unit circle. For example, a ray length of $l_l/2$ is selected where $l_l$ is the length of the label track (e.g., a label box 930 in FIG. 9). In some implementations, the track adjustment system may multiply by ½ to convert length to radius, and by 1/√2 to account for the fact that the normal in the loss on the predicted front (heading) $f_p$ (e.g., predicted front 927 of a predicted box 920 in FIG. 9) is a 2D normal distribution.

In order to isolate the impact of the track angle error on the track front error, the track adjustment system may use a fixed lever arm $l_l/2$ and shift the predicted box center (e.g., center 915 of the predicted box 920 in FIG. 9) to the label box center (e.g., center of a label box 930 in FIG. 9). The track adjustment system may apply the adjustments in local frame to a point along the input track heading $f_i$ (e.g., heading 937 of the label box 930 in FIG. 9), the same $f_i$ may be used to compute the predicted track heading direction in translation loss. In some implementations, $f_i$ may be defined such that a norm of a difference between the input track heading $f_i$ and the input track heading center $f_i$ is equal to $l_l/2$. The predicted track heading $f_p$ may be calculated by applying adjustments (e.g., rotating a point by the angle θ and translating by the translation t) and then translating by a difference between the predicted center $c_p$ and the label center $c_l$.

Then, the track adjustment system may calculate an angle loss by computing the negative log likelihood on the label front $f_l$ and a predicted front distribution (e.g., normal distribution of predicted track heading $f_p$ and the sigma $\sigma_f$) in local frame. Note that $f_l$ and $f_p$ are 2D points, so the $\sigma_f$ can be broadcast across the x and y dimensions. That is, it is assumed that the front point distribution is a circular 2D normal with independent and matching standard deviation across the x and y dimensions.

In some implementations, to compute an extent loss, the track adjustment system may compute loss directly on (1) the scalar label extents (e.g., length and width of the label track) and (2) the predicted extent distributions, for example, a normal distribution of predicted length and a normal distribution of predicted width. Then, the track adjustment system may calculate the extent loss (e.g., length loss and width loss) by (1) computing the negative log likelihood on a label track length, a predicted track length, and a predicted length distribution and (2) computing the negative log likelihood on a label track width, a predicted track width, and a predicted width distribution.

2. Second Example

In some implementation, a track adjustment model (e.g., a model used by MLP 670 in FIG. 6) can output a predicted 2D box (e.g., a predicted box 820 in FIG. 8) as an adjustment to an input track box (e.g., an input box 810 in FIG. 8), parameterized with (1) an angle θ, (2) a translation t, and (3) extents (l, w) of the predicted box, as described above. The input track corners in local frame can be mapped to predicted track corners in local frame by (1) applying predicted extents, e.g., using a 4×4 matrix, to obtain an input track corner; and (2) applying a matrix that rotates a point by the angle θ and then applying the translation t, to obtain the predicted track corners.

In some implementations, the track adjustment model may compute the transform prediction_from_local to obtain the predicted track frame from local frame by (1) applying a planar translation (with t) and rotation transformation (with θ) to obtain a track_from_prediction transform; (2) multiplying a local_from_input_track transform and the track_from_prediction transform; and (3) calculating an inverse of the multiplication result to obtain the transform prediction_from_local.

In some implementations, the track adjustment system (e.g., system 519) may predict a diagonal covariance matrix in the predicted track frame corresponding to the box parameterization of the input track box. That is, the box parameters (e.g., θ, $t_x$, $t_y$, l, w) may be modeled as independent with independent standard deviations of respective box parameters.

In some implementations, the track adjustment system may output a calibrated variance given predicted standard deviations. During calibration, the track adjustment system may also estimate the width error and length error correlation as a constant. The track adjustment system may compute the width-length covariance using a correlation (e.g., a correlation coefficient).

In some implementations, the track adjustment system may calculate an observation Fisher information matrix, which is in the predicted frame and used in a tracker measurement model.

In some implementations, the track adjustment system (e.g., system 519) or tracker (e.g., tracker 510) can compute transformations from outputs of MLP 670 (e.g., learned neural network) in canonical frame to an output box parameterization in local frame. In some implementations, referring to FIG. 8, after extracting features, the track adjustment system may apply a 2-layer MLP (e.g., DecodeRegressionOutput) to the features (e.g., an input box 810) to compute outputs in canonical frame (e.g., a predicted box 820), including, for example, at least one of center translation (e.g., translation ($t_x$, $t_y$) from center 815 to center 825), tangent of the angle in canonical frame (e.g., tangent of the angle θ in FIG. 8), canonical width (e.g., w in FIG. 8), and/or canonical length (e.g., l in FIG. 8). Then, the track adjustment system or the tracker may transform the outputs from canonical frame to input track frame by scaling by (input track extents/2.0), where 2.0 represents an example of the canonical track extents. In some implementations, the track adjustment system or the tracker may output box parameter error standard deviations in predicted track frame by (1) scaling the predicted width error sigma by the input track width, (2) scaling the predicted length error sigma by the input track length, (3) directly predicting the predicted angle error sigma, and/or (4) directly predicting the predicted center translation error sigma, where the sigma are axis-aligned (in x-axis and y-axis, respective) with the predicted track frame. In some implementations, the track adjustment system (e.g., system 519) may calculate loss of an adjustment, e.g., difference between the predicted track and ground truth track, which includes at least one of translation loss, angle loss, or extent loss. The track adjustment system may calculate a box loss by (1) calculating respective losses of an adjustment independently for each of the box parameters (e.g., θ, $t_x$, $t_y$, l, w) and then (2) summing the losses using weights (e.g., different weights between (1) θ, x, y and (2) l, w). The track adjustment system may compute all losses in the predicted track frame so the sigmas can be aligned in the predicted frame. In some implementations, the track adjustment system may compute all losses in a track frame (instead of the predicted track frame), which makes downstream experiments easier and improves convergence.

Figure 10:
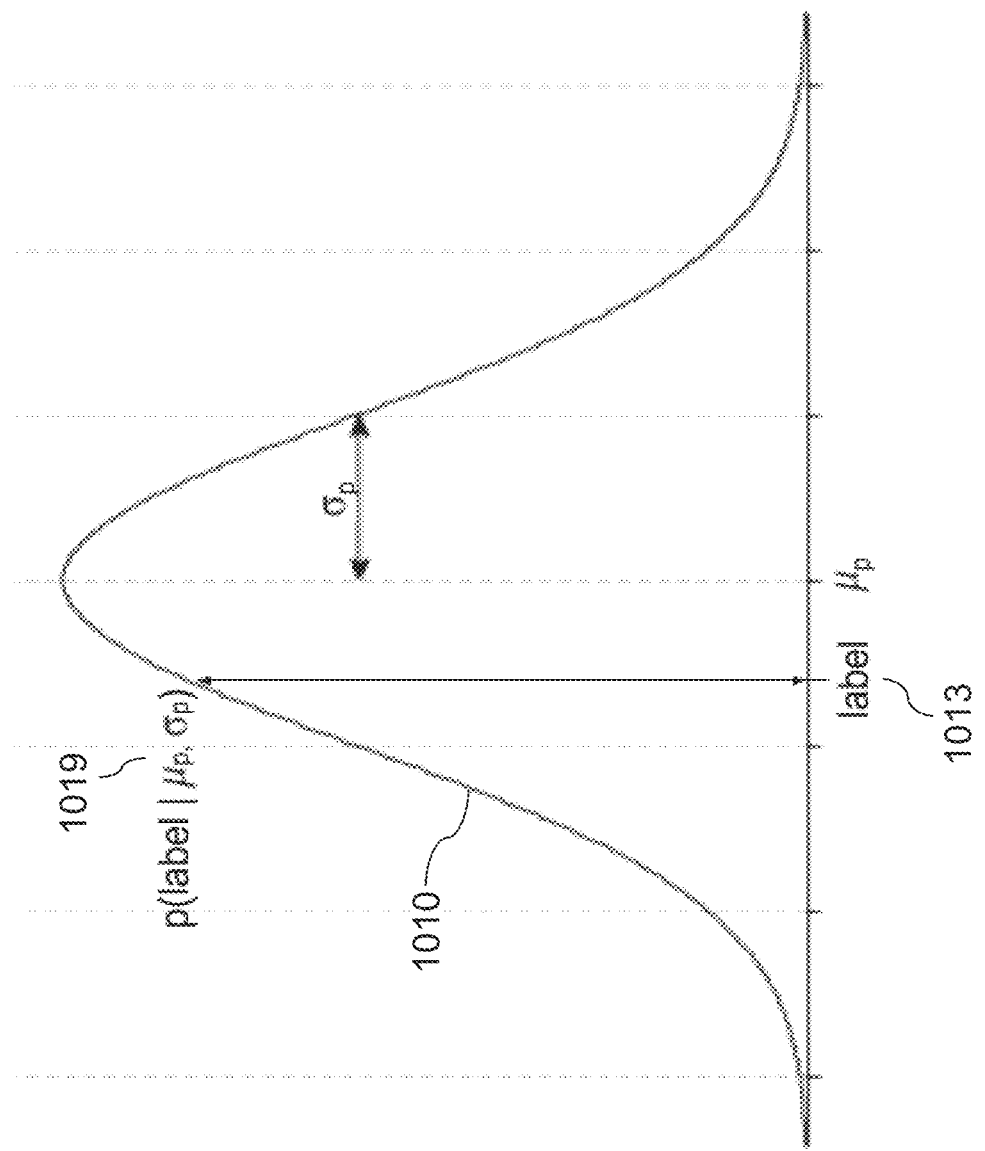
FIG. 10 is a diagram illustrating an example of calculating loss for each box parameter in a predicted track frame according to an exemplary implementation of the present disclosure.

FIG. 10 is a diagram illustrating an example of calculating loss for each box parameter in a predicted track frame according to an exemplary implementation of the present disclosure. In some implementations, referring to FIG. 10, the track adjustment system may compute loss for each predicted box parameter using a negative log likelihood of label (e.g., label 1013 in FIG. 10) and predicted distribution (e.g., distribution ($\mu_p$, $\sigma_p$) denoted by 1010 in FIG. 10). That is, the track adjustment system may maximize the probability of the label parameter value (e.g., probability 1019 in FIG. 10) given the predicted parameter normal distribution (e.g., distribution 1010 in FIG. 10). In some implementations, the track adjustment system may ignore loss values for negative examples (e.g., examples of invalid tracks). For example, the negative log likelihood of label and predicted distribution may be calculated based on a random vector of box parameters using a covariance and a mean vector of the random vector.

In some implementations, the track adjustment system may calculate a translation loss by computing loss on the predicted center and the label center in predicted frame. Because the labels and predictions are in track frame, the track adjustment system may compute a pred_from_input transform to transform to predicted frame from input track frame using an inverse of applying the adjustment (e.g., an inverse of a planar translation with the translation t and a rotation transformation with the angle θ). Then, the track adjustment system may transform the predicted track center to predicted track frame by (1) applying the pred_from_input transform to the predicted track center in input frame; and (2) applying a translation from input frame to predicted frame. Similarly, the track adjustment system may transform the label center to predicted track frame by (1) applying the pred_from_input transform to the label center; and (2) applying a translation from input frame to predicted frame. Then, the track adjustment system may calculate translation loss (e.g., on x-axis and y-axis, respectively) by separately computing (1) the negative log likelihood on x component of the label and x component of predicted distribution and (2) the negative log likelihood on y component of the label and y component of predicted distribution.

In some implementations, the track adjustment system may compute angle loss by first calculating sigma on a point at the end of a ray ($\sigma_f$) as described above in the first example. In some implementations, the track adjustment system may compute the angle needed to rotate the track heading to align with the label heading. Then, the track adjustment system may rotate the level arm about the label orientation angle to obtain an input track heading $f_i$ (e.g., heading 937 of the label box 930 in FIG. 9). The track adjustment system may also rotate the lever arm $l_1/2$ by the predicted angle to obtain a predicted front (heading) $f_p$ (e.g., predicted front 927 of a predicted box 920 in FIG. 9).

Then, the track adjustment system may calculate the angle loss by (1) computing the negative log likelihood on the label front in the x dimension and predicted front distribution in the x dimension (e.g., normal distribution of predicted track heading in the x dimension and the sigma $\sigma_f$); (2) computing the negative log likelihood on the label front in the y dimension and predicted front distribution in the y dimension (e.g., normal distribution of predicted track heading in the x dimension and the sigma $\sigma_y$); and (3) summing the two negative likelihoods. Note that it is assumed that the front point distribution is a circular 2D normal with independent and matching standard deviation across the x and y dimensions.

3. Third Example

In some implementations, the track adjustment model can output a predicted 2D box (e.g., a predicted box 820 in FIG. 8) as an adjustment to an input track box (e.g., an input box 810 in FIG. 8), parameterized with (1) an angle θ, (2) a translation t, and (3) extents (l, w) of the predicted box, as described above, and additionally with (4) a track heading rate adjustment, and (5) a speed adjustment of the track along its x-axis (heading). θ is the angle to rotate an input box such that the heading of the input box matches the predicted box (see FIG. 8), $t=(t_x, t_y)$ is the translation from the input box center to the predicted box center in a 2D input track frame, and (l, w) are the length and width extents of the predicted box. The track heading rate adjustment, in radians per second, may be calculated by subtracting a track heading rate from a true heading rate. The speed adjustment of the track along its x-axis (heading), in m/s, may be calculated by subtracting a track speed from a true speed. In some implementations, the track adjustment system may use the track adjustment model to predict a full 7×7 covariance matrix corresponding to the predicted mean values.

Figure 11:
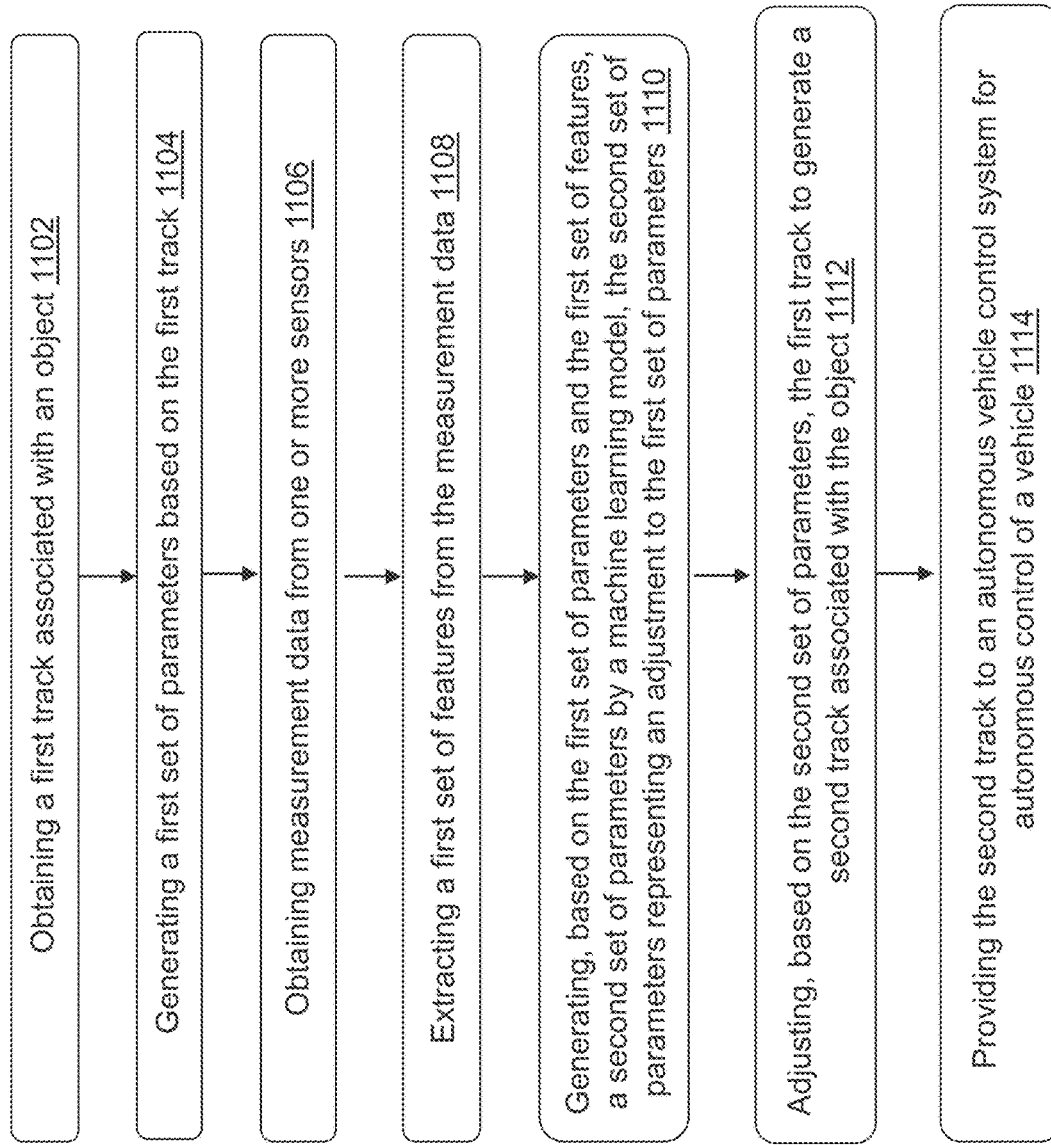
FIG. 11 is a flowchart illustrating an example methodology for adjusting a track according to some implementations.

FIG. 11 is a flowchart illustrating an example methodology for adjusting a track according to some implementations.

In this example methodology, the process begins in block 1102 by obtaining a first track (e.g., tracks 610 in FIG. 6) associated with a first time (e.g., time $t_1$). For example, referring to FIG. 6, the track adjustment system 519 may receive tracks 610 from the tracker 510 or the track manager 512 and publish or send track updates/observations messages 620 to the tracker or the track manager. The tracks 610 may be a previous track of an object at time $t_1$, and the updates/observations messages 620 may represent an adjustment or an update to the previous track at time $t_2$ that is later than $t_1$ ($t_2 > t_1$).

In block 1104, a first set of parameters (e.g., length $l_i$, width $w_i$, input track corner $v_i$ of input box 810 in FIG. 8) may be generated based on the first track. In some implementations, the first set of parameters may define a first box (e.g., input box 810 in FIG. 8) representing the first track.

In block 1106, measurement data (e.g., measurement data 630 in FIG. 6) associated with a second time that is later than the first time, may be obtained from one or more sensors (e.g., lidar sensor 136, radar sensor 134, camera 140 in FIG. 5). For example, the measurement data 630 may be associated with time $t_2$ that is later than $t_1$ ($t_2 > t_1$). The measurement data 630 may be measured at time $t_2$ or contain data associated with time $t_2$.

In block 1108, a first set of features (e.g., features 665 in FIG. 6) may be extracted from the measurement data. In some implementations, the first set of features may include at least one of (1) track or automotive vehicle (AV) metadata, (2) lidar points, (3) radar points, or (4) Hough points. For example, the features of track or AV metadata may represent information that can answer such questions as "where is the track relative to the AV? On the left? Are we viewing the track head on? Or from the side?" or "where is the roadway relative to the track" or "is the track on the road?" The features of lidar points may be extracted from raw lidar data 630 sent from a lidar sensor (e.g., lidar sensor 136 in FIG. 5). In some implementations, the raw lidar data then may be transformed into at least three 2D images: (1) a top down height map; (2) a first height map from a view looking directly at the track; (3) a first height map from a side of the track. For example, the top down height map can provide an image of a car seen from the air while the other two maps can provide views of the track from the point of a person standing on the ground. In some implementations, these images as features can be directly input to a core of a multilayer perception system.

In block 1110, based on the first set of parameters and the first set of features, a second set of parameters (e.g., θ, $t_x$, $t_y$, l, w in FIG. 8) may be generated by a machine learning model (e.g., MLP 670 in FIG. 6). The second set of parameters may represent an adjustment to the first set of parameters. In some implementations, the second set of parameters may define a second box (e.g., predicted box 820 in FIG. 8, predicted box 920 in FIG. 9) representing an adjustment to the first box (e.g., input box 810 in FIG. 8) to be consistent with the measurement data (e.g., measurement data 630 in FIG. 6) associated with the second time (e.g., time $t_2$). The second set of parameters may include at least one of (1) an angle to rotate the first box such that a heading of the first box matches the second box (e.g., θ in FIG. 8), (2) a translation from the first box to the second box (e.g., $t_x$, $t_y$ in FIG. 8), or (3) extents of the second box (e.g., l, w in FIG. 8). The second set of parameters may include a translation from the first box to the second box (e.g., $t_x$, $t_y$ in FIG. 8), and the translation may represent a distance between a center of the first box (e.g., center 815 of input box 810 in FIG. 8) and a center of the second box (e.g., center 825 of predicted box 820 in FIG. 8).

In some implementations, in generating the second set of parameters by the machine learning model, a system (e.g., the track adjustment system 519 or MLP 670 in FIG. 6) may calculate an adjustment loss (e.g., difference between a predicted track and a ground truth track) using sample data representing a ground truth track (e.g., track represented by label box 930 in FIG. 9), train the machine learning model (e.g., MLP 670 in FIG. 6) using the adjustment loss, input the first set of features to the trained machine learning model, and execute the trained machine learning model to output the second set of parameters. The adjustment loss may include at least one of translation loss, angle loss, or extent loss (see First Example described above).

In block 1112, based on the second set of parameters, the first track may be adjusted to generate a second track associated with the second time (e.g., time $t_2$ which is later than $t_1$).

In block 1114, a system (e.g., tracker 510 or tracker manager 512 in FIG. 5 and FIG. 6) may provide the second track associated with the second time to an autonomous vehicle control system (e.g., vehicle control system 120 in FIG. 1) for autonomous control of a vehicle (e.g., vehicle 100 in FIG. 1).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of blocks in the processes disclosed is an example of illustrative approaches. Based upon design preferences, it is understood that the specific order or hierarchy of blocks in the processes may be rearranged while remaining within the scope of the previous description. The accompanying method claims present elements of the various blocks in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the blocks of various examples must be performed in the order presented. As will be appreciated by one of skill in the art the order of blocks in the foregoing examples may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the examples disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The blocks of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method comprising:
    obtaining a first track associated with an object;
    generating, based on the first track, a first set of parameters defining a first box, wherein the first box represents the first track;
    obtaining measurement data from one or more sensors;
    extracting a first set of features from the measurement data;

generating, based on the first set of parameters and the first set of features, a second set of parameters by a machine learning model, the second set of parameters defining a second box, wherein the second set of parameters comprise one or more parameters that are applied to the first set of parameters,
  wherein the second set of parameters further comprise extents of the second box, the extents of the second box including a length and a width of the second box,
  wherein generating the second set of parameters by the machine learning model comprises: (1) inputting the first set of features to the machine learning model; and (2) executing the machine learning model to output the second set of parameters, wherein the machine learning model has been trained by calculating an adjustment loss of using sample data representing a ground truth track, and updating the machine learning model based on the adjustment loss;
adjusting, based on the second set of parameters, the first track to generate a second track associated with the object; and
providing the second track to an autonomous vehicle control system for autonomous control of a vehicle.

2. The method of claim 1, wherein
the first track is associated with a first time, and
the measurement data and the second track are associated with a second time that is later than the first time.

3. The method of claim 1, wherein the second set of parameters define the second box to be consistent with the measurement data.

4. The method of claim 3, wherein the second set of parameters comprise at least one of (1) an angle to rotate the first box such that a heading of the first box matches the second box or (2) a translation from the first box to the second box.

5. The method of claim 3, wherein
the second set of parameters comprise a translation from the first box to the second box, and
the translation represents a distance between a particular portion of the first box and a particular portion of the second box.

6. The method of claim 1, wherein the first set of features comprise at least one of (1) track or automotive vehicle (AV) metadata, (2) lidar points, (3) radar points, or (4) Hough points.

7. The method of claim 1, wherein the adjustment loss comprises at least one of translation loss, angle loss, or extent loss.

8. A system comprising one or more processors and one or more memories operably coupled with the one or more processors, wherein the one or more memories store instructions that, in response to the execution of the instructions by the one or more processors, cause the one or more processors to perform at least the following operations of:
  obtaining a first track associated with an object;
  generating, based on the first track, a first set of parameters defining a first box, wherein the first box represents the first track;
  obtaining measurement data from one or more sensors;
  extracting a first set of features from the measurement data;
  generating, based on the first set of parameters and the first set of features, a second set of parameters by a machine learning model, the second set of parameters defining a second box, wherein the second set of parameters comprise one or more parameters that are applied to the first set of parameters,
    wherein the second set of parameters further comprise extents of the second box, the extents of the second box including a length and a width of the second box,
    wherein generating the second set of parameters by the machine learning model comprises: (1) inputting the first set of features to the machine learning model; and (2) executing the machine learning model to output the second set of parameters, wherein the machine learning model has been trained by calculating an adjustment loss using sample data representing a ground truth track, and updating the machine learning model based on the adjustment loss;
  adjusting, based on the second set of parameters, the first track to generate a second track associated with the object; and
  providing the second track to an autonomous vehicle control system for autonomous control of a vehicle.

9. The system of claim 8, wherein
the first track is associated with a first time, and
the measurement data and the second track are associated with a second time that is later than the first time.

10. The system of claim 9, wherein the second set of parameters define the second box to be consistent with the measurement data associated with the second time.

11. The system of claim 10, wherein the second set of parameters comprise at least one of (1) an angle to rotate the first box such that a heading of the first box matches the second box or (2) a translation from the first box to the second box.

12. The system of claim 10, wherein
the second set of parameters comprise a translation from the first box to the second box, and
the translation represents a distance between a particular portion of the first box and a particular portion of the second box.

13. The system of claim 8, wherein the first set of features comprise at least one of (1) track or automotive vehicle (AV) metadata, (2) lidar points, (3) radar points, or (4) Hough points.

14. The system of claim 8, wherein the adjustment loss comprises at least one of translation loss, angle loss, or extent loss.

15. At least one non-transitory computer-readable medium comprising instructions that, in response to execution of the instructions by one or more processors, cause one or more processors to perform at least the following operations of:
  obtaining a first track associated with an object;
  generating, based on the first track, a first set of parameters defining a first box, wherein the first box represents the first track;
  obtaining measurement data from one or more sensors;
  extracting a first set of features from the measurement data;
  generating, based on the first set of parameters and the first set of features, a second set of parameters by a machine learning model, the second set of parameters defining a second box, wherein the second set of parameters comprise one or more parameters that are applied to the first set of parameters,
    wherein generating the second set of parameters by the machine learning model comprises: (1) inputting the first set of features to the machine learning model; and (2) executing the machine learning model to output the second set of parameters, wherein the machine learning model has been trained by (a) calculating an adjustment loss using sample data representing a ground truth track, the adjustment loss comprises a translation loss, an angle loss, and an extent loss, (b) summing the translation loss, the angle loss, and the extent loss using weights to calculate the adjustment loss, and (c) updating the machine learning model based on the adjustment loss;

adjusting, based on the second set of parameters, the first track to generate a second track associated with the object; and providing the second track to an autonomous vehicle control system for autonomous control of a vehicle.

16. The at least one non-transitory computer-readable medium of claim 15, wherein the first track is associated with a first time, and the measurement data and the second track are associated with a second time that is later than the first time.

17. The method of claim 1, wherein the machine learning model has been trained by calculating a translation loss, an angle loss, and an extent loss using the sample data representing the ground truth track, and summing the translation loss, the angle loss, and the extent loss using weights to calculate the adjustment loss.

18. The system of claim 8, wherein the machine learning model has been trained by calculating a translation loss, an angle loss, and an extent loss using the sample data representing the ground truth track, and summing the translation loss, the angle loss, and the extent loss using weights to calculate the adjustment loss.

* * * * *